United States Patent
Satake et al.

(10) Patent No.: US 9,904,099 B2
(45) Date of Patent: Feb. 27, 2018

(54) LIQUID CRYSTAL DISPLAY DEVICE

(71) Applicant: FUJIFILM Corporation, Tokyo (JP)

(72) Inventors: Ryo Satake, Kanagawa (JP); Megumi Sekiguchi, Kanagawa (JP); Yoji Ito, Kanagawa (JP); Ryo Nakamura, Kanagawa (JP); Rikio Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 13 days.

(21) Appl. No.: 15/285,819

(22) Filed: Oct. 5, 2016

(65) Prior Publication Data

US 2017/0023825 A1   Jan. 26, 2017

Related U.S. Application Data

(63) Continuation of application No. PCT/JP2015/060745, filed on Apr. 6, 2015.

(30) Foreign Application Priority Data

Apr. 7, 2014   (JP) ................................. 2014-078595

(51) Int. Cl.
*G02F 1/1335*   (2006.01)
*G02B 5/30*   (2006.01)

(52) U.S. Cl.
CPC ......... *G02F 1/133528* (2013.01); *G02B 5/30* (2013.01); *G02F 2001/133562* (2013.01);
(Continued)

(58) Field of Classification Search
None
See application file for complete search history.

(56) References Cited

U.S. PATENT DOCUMENTS

2008/0074584 A1* 3/2008 Wu ...................... G02B 5/3025
    349/96
2014/0098331 A1* 4/2014 Hisanaga ............... G02B 1/105
    349/96
(Continued)

FOREIGN PATENT DOCUMENTS

JP   2002-372621 A   12/2002
WO   2013/187134 A1   12/2013

OTHER PUBLICATIONS

International Preliminary Report on Patentability issued by WIPO dated Oct. 20, 2016, in connection with International Patent Application No. PCT/JP2015/060745.
(Continued)

*Primary Examiner* — Ryan Crockett
(74) *Attorney, Agent, or Firm* — Edwards Neils LLC; Jean C. Edwards, Esq.

(57) ABSTRACT

A liquid crystal display device includes: a front-side polarizing plate having a front-side polarizer; a liquid crystal cell; and a rear-side polarizing plate having a rear-side polarizer in this order, in which a distance D1 from a central portion of the front-side polarizer to a central portion of the liquid crystal cell and a distance D2 from a central portion of the rear-side polarizer to the central portion of the liquid crystal cell are different from each other, in which a ratio between an X value, and the distance D1 and a Y value, and the distance D2 rear-side polarizer is in a range of 1±0.12, a distance T1 between the front-side polarizing plate and the liquid crystal cell is 40 μm or more, and a distance T2 between the rear-side polarizing plate and the liquid crystal cell is in a range of 0 to 30 μm.

20 Claims, 1 Drawing Sheet

(52) U.S. Cl.
CPC ............ *G02F 2001/133567* (2013.01); *G02F 2202/28* (2013.01)

(56) References Cited

U.S. PATENT DOCUMENTS

| | | | |
|---|---|---|---|
| 2015/0062502 A1* | 3/2015 | Saneto .................. | G02B 1/105 349/96 |
| 2015/0131038 A1* | 5/2015 | Ishiguro ............ | G02F 1/133528 349/96 |
| 2015/0146140 A1* | 5/2015 | Saneto .................... | G02B 1/14 349/96 |
| 2016/0018578 A1* | 1/2016 | Yonemoto ................ | B32B 7/12 359/487.02 |

OTHER PUBLICATIONS

International Search Report issued in PCT/JP2015/060745 dated Jun. 30, 2015.

* cited by examiner

US 9,904,099 B2

LIQUID CRYSTAL DISPLAY DEVICE

CROSS-REFERENCE TO RELATED APPLICATIONS

This application is a Continuation of PCT International Application No. PCT/JP2015/060745 filed on Apr. 6, 2015, which was published under PCT Article 21(2) in Japanese, and which claims priority under 35 U.S.C. § 119(a) to Japanese Patent Application No. 2014-078595 filed on Apr. 7, 2014. The above applications are hereby expressly incorporated by reference, in their entirety, into the present application.

BACKGROUND OF THE INVENTION

1. Field of the Invention

The present invention relates to a liquid crystal display device. Specifically, the present invention relates to a liquid crystal display device in which a front-side polarizer and a rear-side polarizer have different thicknesses.

2. Description of the Related Art

In recent years, efforts have been made to reduce the thickness of liquid crystal display devices, particularly, liquid crystal display devices for small and medium-size applications, and accordingly, there has been a demand for the thickness reduction of members being used (for example, polarizing plates, glass substrates for liquid crystal cells, and the like).

For example, JP2002-372621A describes "a polarizing plate comprising a protective film attached to at least one surface of a polarizer so that a total thickness of the polarizer and the protective film reaches 135 μm or less, wherein the polarizing plate has at least one resin layer between the polarizer and the protective film or on the surface of the polarizing plate, and a dimensional change rate of the polarizing plate in an absorption axis direction in a case in which the polarizing plate is left to stand for 120 hours under a heated and humidified condition of 60° C. and 90% RH is 0.40% or less" (claim 1) and describes a liquid crystal display device in which this polarizing plate is disposed on at least one side of a liquid crystal cell (claim 8).

In addition, WO2013/187134A describes "a liquid crystal display device comprising a liquid crystal cell provided with a liquid crystal layer between two glass substrates having a thickness of 0.5 mm or less, polarizing plates provided on both surfaces of the liquid crystal cell, and a backlight provided on a rear side of the liquid crystal cell, wherein a difference (D-H) between a contractile force D of the front-side polarizing plate in an absorption axis direction which is computed by multiplying a humidity dimensional change ratio, a modulus of elasticity, and a thickness of the polarizing plate provided on a front side of the liquid crystal cell and a contractile force H of the rear-side polarizing plate in a transmission axis direction which is computed by multiplying a humidity dimensional change ratio, a modulus of elasticity, and a thickness of the polarizing plate provided on a rear side of the liquid crystal cell is 365×10 N/m or less" (claim 1) and also describes an aspect in which a thickness of a polarizer that is used in the front-side polarizing plate is thinner than a thickness of a polarizer that is used in the rear-side polarizing plate (claim 7).

SUMMARY OF THE INVENTION

The present inventors have clarified that, in the liquid crystal display devices according to JP2002-372621A and WO2013/187134A, in a case in which the thickness of the rear-side polarizing plate (a polarizer, a polymer film, or the like) is reduced, when the polarizing plate is attached to the liquid crystal cell, and then air bubbles are removed using a pressurizing and defoaming device (autoclave), there are cases in which liquid crystal display devices to be produced warp.

Therefore, an object of the present invention is to provide a liquid crystal display device capable of suppressing the occurrence of warping even in a case in which the thickness of the rear-side polarizing plate is reduced.

As a result of intensive studies for achieving the above-described object, the present inventors found that, when the distance D from the central portion of a polarizer in the thickness direction to the central portion of a liquid crystal cell in the thickness direction differs on the front side and on the rear side, regarding the value computed by multiplying the thickness of the polarizer, the modulus of elasticity of the polarizer, the humidity dimensional change ratio of the polarizer, and the distance D together, the ratio between the values respectively computed from the front-side polarizing plate and the rear-side polarizing plate is set to a predetermined ratio, furthermore, the distance from the front-side polarizer to the liquid crystal cell is 40 μm or more, and the distance from the rear-side polarizer to the liquid crystal cell is in a range of 0 to 30 μm, the occurrence of warping can be suppressed even in a case in which the thickness of the rear-side polarizing plate is reduced, and the present invention was completed.

That is, it was found that the above-described object can be achieved using the following constitutions.

[1] A liquid crystal display device comprising: a front-side polarizing plate having at least a front-side polarizer, a liquid crystal cell; and a rear-side polarizing plate having at least a rear-side polarizer in this order, in which a distance D1 from a central portion of the front-side polarizer in a thickness direction to a central portion of the liquid crystal cell in the thickness direction and a distance D2 from a central portion of the rear-side polarizer in the thickness direction to the central portion of the liquid crystal cell in the thickness direction are different from each other, a ratio between an X value which is computed by multiplying a thickness of the front-side polarizer, a modulus of elasticity of the front-side polarizer, a humidity dimensional change ratio of the front-side polarizer, and the distance D1 and a Y value which is computed by multiplying a thickness of the rear-side polarizer, a modulus of elasticity of the rear-side polarizer, a humidity dimensional change ratio of the rear-side polarizer, and the distance D2 is in a range of 1±0.12, a distance T1 from a surface of the front-side polarizer on a liquid crystal cell side to a surface of the liquid crystal cell on a front-side polarizer side in the front-side polarizing plate is 40 μm or more, and a distance T2 from a surface of the rear-side polarizer on a liquid crystal cell side to a surface of the liquid crystal cell on a rear-side polarizer side in the rear-side polarizing plate is in a range of 0 to 30 μm.

[2] The liquid crystal display device according to [1], in which the front-side polarizing plate has a front-side inner functional layer between the front-side polarizer and the liquid crystal cell.

[3] The liquid crystal display device according to [1] or [2], in which the rear-side polarizing plate has a rear-side inner functional layer between the rear-side polarizer and the liquid crystal cell.

[4] The liquid crystal display device according to [1] or [2], in which, in the rear-side polarizing plate, the rear-side polarizer and the liquid crystal cell are adjacent to each other directly or via a pressure sensitive adhesive or an adhesive.

[5] The liquid crystal display device according to any one of [1] to [4], in which the front-side polarizing plate has a front-side outer polymer film on a side of the front-side polarizer opposite to the liquid crystal cell.

[6] The liquid crystal display device according to any one of [1] to [5], in which the rear-side polarizing plate has a rear-side outer polymer film on a side of the rear-side polarizer opposite to the liquid crystal cell.

[7] The liquid crystal display device according to any one of [1] to [6], in which the X value which is computed by multiplying the thickness of the front-side polarizer, the modulus of elasticity of the front-side polarizer, the humidity dimensional change ratio of the front-side polarizer, and the distance D1, the Y value which is computed by multiplying the thickness of the rear-side polarizer, the modulus of elasticity of the rear-side polarizer, the humidity dimensional change ratio of the rear-side polarizer, and the distance D2, and a Z value which is computed by multiplying a modulus of elasticity of a glass substrate in the liquid crystal cell and a total thickness of the glass substrate satisfy Expression (1) below.

$$X+Y<0.034\times Z \quad (1)$$

[8] The liquid crystal display device according to any one of [1] to [7], in which the front-side polarizing plate and the liquid crystal cell are adjacent to each other via a pressure sensitive adhesive or an adhesive, and a thickness of the pressure sensitive adhesive or the adhesive is 15 μm or less.

According to the present invention, it is possible to provide a liquid crystal display device capable of suppressing the occurrence of warping even in a case in which the thickness of the rear-side polarizing plate is reduced.

DESCRIPTION OF THE PREFERRED EMBODIMENTS

Figure 1A:
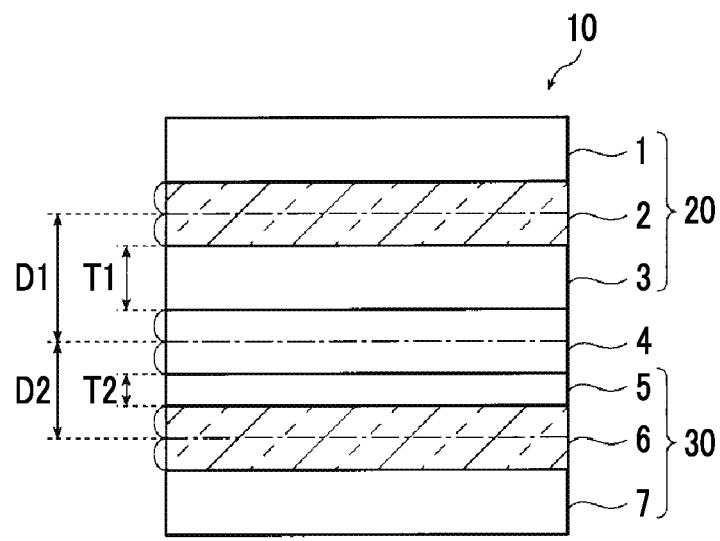
FIG. 1A and FIG. 1B are respectively schematic cross sectional views illustrating examples of embodiments of a liquid crystal display device of the present invention.

Hereinafter, the present invention will be described in detail.

Constitutional elements that will be described below will be described on the basis of typical embodiments of the present invention, but the present invention is not limited to those embodiments.

Meanwhile, in the present specification, numeric ranges expressed using "to" include numeric values before and after the "to" as the lower limit value and the upper limit value.

[Liquid Crystal Display Device]

A liquid crystal display device of the present invention is a liquid crystal display device including a front-side polarizing plate having at least a front-side polarizer, a liquid crystal cell, and a rear-side polarizing plate having at least a rear-side polarizer in this order, in which a distance D1 from a central portion of the front-side polarizer in a thickness direction to a central portion of the liquid crystal cell in the thickness direction and a distance D2 from a central portion of the rear-side polarizer in the thickness direction to the central portion of the liquid crystal cell in the thickness direction are different from each other, in which a ratio between an X value which is computed by multiplying a thickness of the front-side polarizer, a modulus of elasticity of the front-side polarizer, a humidity dimensional change ratio of the front-side polarizer, and the distance D1 and a Y value which is computed by multiplying a thickness of the rear-side polarizer, a modulus of elasticity of the rear-side polarizer, a humidity dimensional change ratio of the rear-side polarizer, and the distance D2 is in a range of 1±0.12, a distance T1 from a surface of the front-side polarizer on a liquid crystal cell side to a surface of the liquid crystal cell on a front-side polarizer side in the front-side polarizing plate is 40 μm or more, and a distance T2 from a surface of the rear-side polarizer on a liquid crystal cell side to a surface of the liquid crystal cell on a rear-side polarizer side in the rear-side polarizing plate is in a range of 0 to 30 μm.

<Modulus of Elasticity>

The modulus of elasticity (GPa) of the polarizer refers to a value measured by preparing a specimen having a length in a measurement direction of 200 mm and a width of 10 mm, leaving the specimen to stand in an environment of 25° C. and a relative humidity of 60% for 48 hours, and immediately installing the specimen using a strograph V10-C manufactured by Toyo Seiki Kogyo Co., Ltd. so that the length between chucks reaches 100 mm.

In addition, in a case in which the specimen size fails to satisfy 200 mm×10 mm, the modulus of elasticity can be computed using a specimen having a length in the measurement direction of 35 mm and a width of 5 mm which is cut out from a specimen having a humidity that has been adjusted at 25° C. and a relative humidity of 60% for three days. Meanwhile, in this case, the modulus of elasticity is computed using a dynamic viscoelastic analyzer (DVA-225, manufactured by ITK Co., Ltd.) by setting the environment of a measurement chamber to a relative humidity of 60%, increasing the temperature at 2° C./minute in a tensile mode with a frequency of 1 Hz and a displacement amplitude of 0.02 mm, measuring moduli of elasticity in a temperature range of 0° C. to 100° C., and averaging values obtained in a temperature range of 20° C. to 30° C.

Here, in a case in which the liquid crystal display device has a rectangular shape, the specimen of the polarizer is produced by being cut out from the polarizer so that the measurement direction becomes the same direction as the long side (longitudinal) direction of the liquid crystal display device (panel) for both the front-side polarizer and the rear-side polarizer.

In addition, in a case in which the liquid crystal display device has a square shape, the specimen of the front-side polarizer is produced by being cut out from the polarizer so that the measurement direction becomes perpendicular or parallel to the absorption axis of the front-side polarizer, and the specimen of the rear-side polarizer is produced by being cut out from the polarizer so that the measurement direction becomes the same direction as the direction in which the specimen of the front-side polarizer is cut out.

Meanwhile, in the present specification, angles (for example, angles of "90°" and the like) and relationships therebetween (for example, "perpendicular", "parallel", "the same direction", and the like) may vary within the margin of error acceptable in the technical field to which the present invention belongs. At this time, the acceptable margin of error refers to, for example, ± smaller than 10° from the exact angle, and, specifically, the margin of error from the exact angle is preferably 5° or smaller and more preferably 3° or smaller.

<Humidity Dimensional Change Ratio>

The humidity dimensional change ratio of the polarizer is measured by, first, preparing a specimen having a length in a measurement direction of 12 cm and a width of 3 cm, opening pin holes in the specimen at intervals of 10 cm in an environment of 25° C. and a relative humidity of 60%, leaving the specimen to stand in an environment of 25° C. and a relative humidity of 80% for 48 hours, and then immediately measuring the intervals between the pin holes using a pin gauge. Meanwhile, the measurement value will be indicated by "LA1".

Here, in a case in which the liquid crystal display device has a rectangular shape, similar to the above-described specimen used to measure the modulus of elasticity of the polarizer, the specimen of the polarizer used to measure the humidity dimensional change ratio is produced by being cut out from the polarizer so that the measurement direction becomes the same direction as the long side (longitudinal) direction of the liquid crystal display device (panel) for both the front-side polarizer and the rear-side polarizer. In addition, in a case in which the liquid crystal display device has a square shape, the specimen of the front-side polarizer is produced by being cut out from the polarizer so that the measurement direction becomes perpendicular or parallel to the absorption axis of the front-side polarizer, and the specimen of the rear-side polarizer is produced by being cut out from the polarizer so that the measurement direction becomes the same direction as the direction in which the specimen of the front-side polarizer is cut out.

Next, the specimen is left to stand in an environment of 25° C. and a relative humidity of 10% for 48 hours, and then the intervals between the pin holes are immediately measured using the pin gauge. Meanwhile, the measurement value will be indicated by "LC0".

The humidity dimensional change ratio refers to a value computed from the following expression using these measurement values.

The humidity dimensional change ratio [%]={(LA1 [cm]−LC0 [cm])/10 [cm]}×100

<X Value and Y Value>

The X value which is computed by multiplying the thickness of the front-side polarizer, the modulus of elasticity of the front-side polarizer, the humidity dimensional change ratio of the front-side polarizer, and the distance D1 is, among dynamic factors having an influence on warping of the display device, a value indicating a moment generated due to the humidity dimensional change of the front-side polarizer. An increase of this value increases the moment and a force warping the liquid crystal cell toward the front side, and a decrease of this value decreases the moment and weakens a force warping the liquid crystal cell toward the front side.

Similarly, the Y value which is computed by multiplying the thickness of the rear-side polarizer, the modulus of elasticity of the rear-side polarizer, the humidity dimensional change ratio of the rear-side polarizer, and the distance D2 is, among dynamic factors having an influence on warping of the display device, a value indicating a moment generated due to the humidity dimensional change of the rear-side polarizer. An increase of this value increases the moment and a force warping the liquid crystal cell toward the rear side, and a decrease of this value decreases the moment and weakens a force warping the liquid crystal cell toward the rear side.

In the present invention, as described above, since the distance D1 and the distance D2 are different from each other, the ratio between the X value in the front-side polarizing plate and the Y value in the rear-side polarizing plate is in a range of 1±0.12, furthermore, the distance T1 is 40 μm or more, and the distance T2 is in a range of 0 to 30 μm, it is possible to suppress the liquid crystal display device being warped even in a case in which the thickness of the rear-side polarizing plate is reduced.

The details of the reason for what has been described above are not clear, but are roughly assumed as described below.

That is, it is considered that, even in a case in which the thickness is reduced by shortening the distance (T2) between the rear-side polarizer and the liquid crystal cell, when the ratio between the X value and the Y value is set in a specific range, and the moments for warping of the front-side polarizing plate and the rear-side polarizing plate are set to be substantially equal to each other, warping of the front-side polarizing plate and the rear-side polarizing plate which is caused by the extension and contraction of the polarizers due to changes in the temperature and the humidity after autoclaving is offset, and consequently, warping of the display device can be suppressed.

Next, the overall constitution of the liquid crystal display device of the present invention will be described using FIG. 1A and FIG. 1B, and individual constitutions of the liquid crystal display device and the polarizing plates will be described in detail.

Figure 1B:
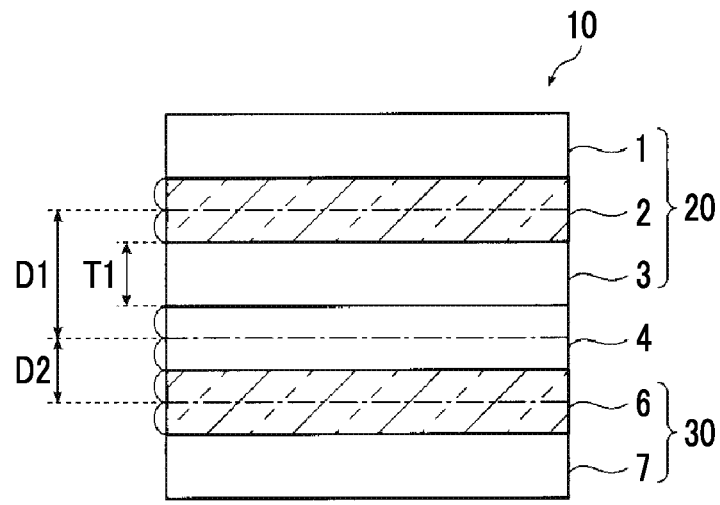

FIG. 1A and FIG. 1B are schematic cross sectional views illustrating examples of embodiments of the liquid crystal display device of the present invention.

As illustrated in FIG. 1A, a liquid crystal display device 10 includes a front-side polarizing plate 20 having at least a front-side polarizer 2, a liquid crystal cell 4, and a rear-side polarizing plate 30 having at least a rear-side polarizer 6 in this order, and the distance D1 from the central portion of the front-side polarizer 2 in the thickness direction to the central portion of the liquid crystal cell 4 in the thickness direction and the distance D2 from the central portion of the rear-side polarizer 6 in the thickness direction to the central portion of the liquid crystal cell 4 in the thickness direction are different from each other.

Here, in the liquid crystal display device 10, the ratio between the above-described X value in the front-side polarizer 2 and the above-described Y value in the rear-side polarizer 6 is in a range of 1+0.12, the distance T1 from the surface of the front-side polarizer 2 on the liquid crystal cell side to the surface of the liquid crystal cell 4 on the front-side polarizer side in the front-side polarizing plate 20 is 40 μm or more, and the distance T2 from the surface of the rear-side polarizer 6 on the liquid crystal cell side to the surface of the liquid crystal cell 4 on the rear-side polarizer side in the rear-side polarizing plate 30 is in a range of 0 to 30 μm.

In addition, in the liquid crystal display device of the present invention, as illustrated in FIG. 1A, the front-side polarizing plate 20 preferably has a front-side outer polymer film 1 and a front-side inner functional layer 3, and similarly, the rear-side polarizing plate 30 preferably has a rear-side inner functional layer 5 and a rear-side outer polymer film 7.

Furthermore, from the viewpoint of additional thickness reduction, the liquid crystal display device of the present invention is preferably an aspect in which the rear-side inner functional layer 5 is not provided, and the liquid crystal cell 4 and the rear-side polarizer 6 are directly adjacent to each other as illustrated in FIG. 1B or are adjacent to each other via a pressure sensitive adhesive or an adhesive not illustrated. Meanwhile, the aspect illustrated in FIG. 1B is an aspect in which the above-described distance T2 reaches 0 μm.

[Front-side Polarizing Plate]

The front-side polarizing plate in the liquid crystal display device of the present invention has at least a front-side polarizer.

In addition, from the viewpoint of the durability or resistance to ultraviolet rays of the front-side polarizer, the front-side polarizing plate preferably has a front-side outer polymer film on a side of the front-side polarizer opposite to the liquid crystal cell.

In addition, from the viewpoint of the durability of the front-side polarizer, the front-side polarizing plate preferably has a front-side inner functional layer between the front-side polarizer and the liquid crystal cell.

<Front-side Polarizer>

The front-side polarizer is not particularly limited, and it is possible to use an ordinarily-used polarizer.

Examples of the front-side polarizer include polarizers obtained by adsorbing a dichroic substance such as iodine or a dichroic dye to a hydrophilic polymer film such as a polyvinyl alcohol-based film, a partially-formalized polyvinyl alcohol-based film, or an ethylene-vinyl acetate copolymer-based partially-saponified film and uniaxially stretching the film; polyene-based aligned films such as dehydrated substances of polyvinyl alcohol and dehydrochlorinated substances of polyvinyl chlorides; and the like.

Among these, polarizers made up of a polyvinyl alcohol-based film and a dichroic substance such as iodine are suitable.

The thickness of the front-side polarizer is not particularly limited, but is preferably 25 μm or less and more preferably 15 μm or less from the viewpoint of additional thickness reduction. The lower limit is not particularly limited and is generally 1 μm or more.

<Front-side Outer Polymer Film>

The front-side outer polymer film is not particularly limited, and it is possible to use an ordinarily-used polymer film respectively and independently.

Specific examples of a polymer constituting the polymer film include cellulose acylate-based films, (meth)acrylic resin-based films, cycloolefin-based resin films, polyester resin-based films, and the like.

Meanwhile, the (meth)acrylic resins refer to both methacrylic resins and acrylic resins, and derivatives of acrylates/methacrylates, particularly, (co)polymers of acrylate esters/methacrylate esters are also considered as the (meth)acrylic resins. In addition, examples of the (meth)acrylic resins also include, in addition to methacrylic resin and acrylic resins, (meth)acrylic polymers having a ring structure in the main chain such as polymers having a lactone ring, maleic anhydride-based polymers having a succinic anhydride ring, polymers having a glutaric anhydride ring, and glutarimide ring-containing polymers.

Among these, cellulose acylate-based films and (meth)acrylic resin-based films are preferred since handling becomes easy during the formation of the films and the design range of phase differences is wide.

As cellulose acylate-based films that can be suitably used as the front-side outer polymer film, it is possible to use a variety of well-known films, and specific examples of the film that can be used include the films described in JP2012-076051A.

In addition, as (meth)acrylic resin-based films, a variety of well-known films can be used, and specific examples of the films that can be preferably employed include the acrylic films described in Paragraphs [0032] to [0063] of JP2010-079175A, the lactone ring-containing polymers described in Paragraphs [0017] to [0107] of JP2009-98605A, and the like.

The thickness of the front-side outer polymer film is not particularly limited, but is preferably in a range of 20 μm to 60 μm and more preferably in a range of 20 μm to 50 μm from the viewpoint of additional thickness reduction.

<Front-side Inner Functional Layer>

The front-side inner functional layer is not particularly limited, and it is possible to use ordinarily-used polymer films, retardation films, hardcoat layers, liquid crystal layers, and the like.

As the front-side inner functional layer, for example, in addition to the above-described polymer films that are the same as the front-side outer polymer film, cycloolefin-based resin films or retardation films can be suitably used.

(Cycloolefin-based Resin Film)

As cycloolefin-based resin films that can be suitably used as the front-side inner functional layer, it is possible to use a variety of well-known films, and specific examples of the film that can be used include the films described in Paragraphs [0030] to [0144] of JP2006-188671A.

(Retardation Film)

As the retardation film that can be suitably used as the front-side inner functional layer, it is possible to use well-known films in the related art, and, for example, retardation films obtained by aligning a liquid crystal layer (optically anisotropic layer) in a transparent support via an alignment membrane and the like can be used.

<Transparent Support>

Example of a material forming the transparent support that constitutes an example of the retardation film include cellulose-based polymers (cellulose acylate); acrylic polymers having an acrylic acid ester polymer such as polymethyl methacrylate and lactone ring-containing polymers; thermoplastic norbornene-based polymers; polycarbonate-based polymers; polyester-based polymers such as polyethylene terephthalate and polyethylene naphthalate; styrene-based polymers such as polystyrene and acrylonitrile-styrene copolymers (AS resins); polyolefin-based polymers such as polyethylene, polypropylene, ethylene-propylene copolymers; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing the above-described polymers.

Among these, cellulose acylate can be preferably used.

The thickness of the transparent support is not particularly limited, but the thickness of the transparent support that can be used is preferably in a range of approximately 10 μm to 200 μm, more preferably in a range of 10 μm to 100 μm, and still more preferably in a range of 20 μm to 90 μm. In addition, the transparent support may be a laminate of multiple layers.

<Alignment Membrane>

The alignment membrane constituting an example of the retardation film generally includes a polymer as a main component. A number of publications describe polymer materials for the alignment membrane, and a number of commercially available products can be procured. Polymer materials that are used in the present invention are preferably polyvinyl alcohols, polyimides, or derivatives thereof. Particularly, modified or non-modified polyvinyl alcohols are preferred. Regarding alignment membranes that can be used in the present invention, it is possible to refer to the modified polyvinyl alcohols described in Line 24 on Page 43 through Line 8 on Page 49 of WO01/88574A and Paragraphs [0071] to [0095] of JP3907735B.

<Liquid Crystal Layer>

The liquid crystal layer constituting an example of the retardation film is preferably formed by fixing the alignment state of a liquid crystal compound, and, specifically, a method in which a liquid crystal compound having an unsaturated double bond (polymerizable group) is used, and this liquid crystal compound is fixed by means of polymerization and the like are suitably exemplified. Meanwhile, the liquid crystal layer may have a single-layer structure or a laminate structure.

The kind of the unsaturated double bond in the liquid crystal compound is not particularly limited, but a functional group capable of an addition polymerization reaction is preferred, and a polymerizable ethylenic unsaturated group or a ring-polymerizable group is preferred. More specifically, a (meth)acryloyl group, a vinyl group, a styryl group, an allyl group, or the like is preferred, and a (meth)acryloyl group is more preferred.

Generally, liquid crystal compounds are classified into rod-like liquid crystal compounds and disc-like liquid crystal compounds depending on the shapes. Furthermore, there are low-molecular-weight liquid crystal compounds and high-molecular-weight liquid crystal compounds respectively. High-molecular-weight liquid crystal compounds generally refer to liquid crystal compounds having a degree of polymerization of 100 or more (Polymer Physics and Phase Transition Dynamics, by Masao, Doi, page 2, Iwanami Shoten, Publishers, 1992). In the present invention, any liquid crystal compounds can be used, but rod-like liquid crystal compounds (nematic liquid crystal compounds, smetic liquid crystal compounds, and cholesteric liquid crystal compounds) and disc-like liquid crystal compounds (discotic liquid crystal compounds) can be preferably used. Two or more kinds of rod-like liquid crystal compounds, two or more kinds of disc-like liquid crystal compounds, or mixtures of a rod-like liquid crystal compound and a disc-like liquid crystal compound may be used. In order to fix the above-described liquid crystal compound, the liquid crystal layer is more preferably formed using a rod-like liquid crystal compound or disc-like liquid crystal compound having a polymerizable group, and the liquid crystal compound still more preferably has two or more polymerizable groups in one molecule. In the case of a mixture of two or more kinds of the liquid crystal compounds, at least one kind of the liquid crystal compound preferably has two or more polymerizable groups in one molecule.

As the rod-like liquid crystal compound, for example, the rod-like liquid crystal compounds described in claim 1 of JP1999-513019A (JP-H11-513019A) or Paragraphs [0026] to [0098] of JP2005-289980A can be preferably used, and, as the discotic liquid crystal compounds, for example, the discotic liquid crystal compounds described in Paragraphs [0020] to [0067] of JP2007-108732A and Paragraphs [0013] to [0108] of JP2010-244038A can be preferably used, but the liquid crystal compounds are not limited thereto.

In the liquid crystal layer, in addition to the liquid crystal compound, an additive that accelerates horizontal alignment and vertical alignment (alignment-controlling agent) may be used to put the liquid crystal compound into a horizontal alignment or vertical alignment state. As the additive, a variety of well-known additives can be used.

The thickness of the liquid crystal layer is not particularly limited, but the thickness of the liquid crystal layer that is used is preferably in a range of approximately 0.2 µm to 10 µm, more preferably in a range of 0.2 µm to 5 µm, and still more preferably in a range of 0.2 µm to 3 µm. In addition, the liquid crystal layer may be a laminate of multiple layers.

The method for producing the retardation film is not particularly limited, and, for example, the retardation film can be formed by applying a composition including the above-described liquid crystal compound onto the above-described transparent support directly or via the above-described alignment membrane, drying the composition by means of heating, and then curing the composition.

In the present invention, the thickness of the front-side inner functional layer is not particularly limited as long as the above-described distance T1, that is, the distance from the surface of the front-side polarizer on the liquid crystal cell side to the surface of the liquid crystal cell on the front-side polarizer side in the front-side polarizing plate is 40 µm or more, but is preferably in a range of 20 µm to 60 µm and more preferably in a range of 20 µm to 50 µm.

In addition, in the present invention, the distance T1 from the surface of the front-side polarizer on the liquid crystal cell side to the surface of the liquid crystal cell on the front-side polarizer side in the front-side polarizing plate is 40 µm or more; however, from the viewpoint of additional thickness reduction, the distance is preferably in a range of 40 µm to 60 µm and more preferably in a range of 40 µm to 50 µm.

[Rear-side Polarizing Plate]

The rear-side polarizing plate in the liquid crystal display device of the present invention has at least a rear-side polarizer.

In addition, from the viewpoint of the durability or backlight adequacy of the rear-side polarizer, the rear-side polarizing plate preferably has a rear-side outer polymer film on a side of the rear-side polarizer opposite to the liquid crystal cell.

In addition, the rear-side polarizing plate may have a rear-side inner functional layer between the rear-side polarizer and the liquid crystal cell, but preferably has no rear-side inner functional layer from the viewpoint of additional thickness reduction.

<Rear-side Polarizer>

The rear-side polarizer is not particularly limited, and it is possible to use an ordinarily-used polarizer. The same polarizer as the above-described front-side polarizer can also be used.

In addition, the thickness of the rear-side polarizer is not particularly limited, but is preferably 25 µm or less and more preferably 15 µm or less from the viewpoint of additional thickness reduction. The lower limit is not particularly limited and is generally 1 µm or more.

<Rear-side Outer Polymer Film>

The rear-side outer polymer film is not particularly limited, and it is possible to use an ordinarily-used polymer film. The same polymer film as the above-described front-side outer polymer film can also be used.

In addition, the thickness of the rear-side outer polymer film is not particularly limited, but is preferably in a range of 20 µm to 60 µm and more preferably in a range of 20 µm to 50 µm from the viewpoint of additional thickness reduction.

<Rear-side Inner Functional Layer>

The rear-side inner functional layer is not particularly limited, and it is possible to use ordinarily-used polymer films, retardation films, hardcoat layers, liquid crystal layers, and the like.

As the rear-side inner functional layer, for example, in addition to the same polymer films as the above-described front-side (and rear-side) outer polymer film, hardcoat layers or liquid crystal layers can be suitably used.

(Hardcoat Layer)

As the hardcoat layer, it is possible to use, for example, the hardcoat layers described in Paragraphs [0190] to [0196] of JP2009-98658A.

In addition, the hardcoat layer is preferably formed by means of a crosslinking reaction or polymerization reaction of an ionizing radiation-curable compound.

For example, the hardcoat layer can be formed by applying a coating composition including an ionizing radiation-curable polyfunctional monomer or polyfunctional oligomer onto a protective layer described below and crosslinking or polymerizing the polyfunctional monomer or polyfunctional oligomer.

The functional group of the ionizing radiation-curable polyfunctional monomer or polyfunctional oligomer is preferably a light, electron beam, or radiation-polymerizable functional group, and, among these, a light-polymerizable functional group is preferred.

Examples of the light-polymerizable functional group include unsaturated polymerizable functional groups such as a (meth)acryloyl group, a vinyl group, a styryl group, and an allyl group, and the like, and, among these, a (meth)acryloyl group is preferred.

In addition, for the purpose of imparting internal scattering properties, the hardcoat layer may include matting particles having an average particle diameter in a range of 1.0 μm to 10.0 μm and preferably in a range of 1.5 to 7.0 μm, for example, particles of an inorganic compound or resin particles.

The thickness of the hardcoat layer is not particularly limited, but the thickness of the hardcoat layer that is used is preferably in a range of approximately 1 μm to 20 μm and more preferably in a range of 2 μm to 10 μm.

(Liquid Crystal Layer)

Examples of the liquid crystal layer include the same liquid crystal layers as the above-described liquid crystal layer constituting the retardation film which is an example of the above-described front-side inner functional layer.

The thickness of the liquid crystal layer is not particularly limited, but the thickness of the liquid crystal layer that is used is preferably in a range of approximately 1 μm to 20 μm and more preferably in a range of 2 μm to 10 μm.

In the present invention, the distance T2 from the surface of the rear-side polarizer on the liquid crystal cell side to the surface of the liquid crystal cell on the rear-side polarizer side in the rear-side polarizing plate is in a range of 0 to 30 μm; however, from the viewpoint of additional thickness reduction, the distance is preferably in a range of 0 μm to 25 μm, and, for example, an aspect in which the rear-side inner functional layer is not provided, and the rear-side polarizer and the liquid crystal cell are directly adjacent to each other (that is, T2=0 μm), an aspect in which the rear-side inner functional layer is not provided, and the rear-side polarizer and the liquid crystal cell are adjacent to each other via a pressure sensitive adhesive or an adhesive having a membrane thickness in a range of approximately 15 to 20 μm (that is, T2≈15 to 20 μm), or an aspect in which the rear-side inner functional layer having a thin membrane thickness (for example, approximately 0.2 to 3 μm) and a pressure sensitive adhesive or an adhesive having a membrane thickness in a range of approximately 15 to 20 μm are provided between the rear-side polarizer and the liquid crystal cell (that is, T2≈0.2 to 3+15 to 20 μm) is more preferred.

[Relationship Between Front-side Polarizing Plate and Rear-side Polarizing Plate]

In the present invention, as described above, when the ratio between the X value which is computed by multiplying the thickness of the front-side polarizer, the modulus of elasticity of the front-side polarizer, the humidity dimensional change ratio of the front-side polarizer, and the distance D1 and the Y value which is computed by multiplying the thickness of the rear-side polarizer, the modulus of elasticity of the rear-side polarizer, the humidity dimensional change ratio of the rear-side polarizer, and the distance D2 is in a range of 1±0.12, the distances D1 and D2 become different from each other, and it is possible to suppress the liquid crystal display device being warped even when the distance T2 from the surface of the rear-side polarizer on the liquid crystal cell side to the surface of the liquid crystal cell on the rear-side polarizer side in the rear-side polarizing plate is in a range of 0 to 30 μm.

Here, the ratio between the X value and the Y value is preferably in a range of 1±0.07 and more preferably in a range of 1±0.05.

Meanwhile, in a case in which the liquid crystal display device has a square shape, the ratio between the X value and the Y value may satisfy 1±0.12 in any one of (i) a result computed by introducing an modulus of elasticity and a humidity dimensional change ratio which are measured by producing a specimen of the front-side polarizer cut out so that the measurement direction becomes a direction orthogonal to the absorption axis of the front-side polarizer and a specimen of the rear-side polarizer cut out so that the measurement direction becomes a direction parallel to the absorption axis of the rear-side polarizer and (ii) a result computed by introducing an modulus of elasticity and a humidity dimensional change ratio which are measured by producing a specimen of the front-side polarizer cut out so that the measurement direction becomes a direction parallel to the absorption axis of the front-side polarizer and a specimen of the rear-side polarizer cut out so that the measurement direction becomes a direction orthogonal to the absorption axis of the rear-side polarizer.

[Liquid Crystal Cell]

The liquid crystal cell that is used in the liquid crystal display device of the present invention is not particularly limited, and liquid crystal cells having a variety of well-known modes can be used.

Specific examples of the modes include an IPS mode, a VA mode, a TN mode, an OCB mode, an ECB mode, and the like.

Among these, the IPS mode and the VA mode are preferred since the visibility is high, and the thickness of the liquid crystal display device can be further reduced.

<Thickness of Liquid Crystal Layer>

In the present invention, when the distance D1 from the central portion of the front-side polarizer in the thickness direction to the central portion of the liquid crystal cell in the thickness direction and the distance D2 from the central portion of the rear-side polarizer in the thickness direction to the central portion of the liquid crystal cell in the thickness direction are computed, the thickness of a liquid crystal layer in the liquid crystal cell may be ignored.

The thickness of the liquid crystal layer is, generally, far smaller than that of a glass substrate in the liquid crystal cell, and thus, in a case in which the thickness of the liquid crystal layer is small, the influence of the liquid crystal layer can be ignored.

Specifically, in a case in which the thickness of the liquid crystal layer is 5 μm or less, the effects of the present invention are not affected even when the values of the distances D1 and D2 are computed while ignoring the thickness of the liquid crystal layer.

<Thickness of Glass Substrate>

The thickness of the glass substrate in the liquid crystal cell that is used in the liquid crystal display device of the present invention is not particularly limited, but it becomes easier for the liquid crystal cell to be warped as the glass substrate becomes thinner, and thus the improvement effect of the present invention is significant.

Specifically, the thickness of the glass substrate is preferably in a range of 10 μm to 1,000 μm, more preferably in a range of 10 μm to 500 μm, and still more preferably in a range of 20 μm to 200 μm.

The present inventors found that, even when the above-described X value and Y value are within a predetermined ratio (1±0.12), the degree of warping varies depending on the thickness of the glass substrate in the liquid crystal cell.

In addition, as a result of intensive studies, the present inventors found that, when a Z value which is computed by multiplying the modulus of elasticity of the glass substrate in the liquid crystal cell and the total thickness of the glass substrate satisfies Expression (1) below in the relationship with the above-described X value and Y value, it is possible to further suppress the liquid crystal display device being warped. This finding enables an assumption that, in a region in which Expression (1) below is satisfied, the stiffness of the glass substrate is effective for suppressing warping.

$$X+Y<0.034 \times Z \qquad (1)$$

Here, the modulus of elasticity (unit: GPa) of the glass substrate refers to a value measured on the basis of ISO014577 (indentation modulus of elasticity) using a nanoindentation tester (manufactured by Fischer Technology, Inc., device name: PICODENTOR HM2000) and a Berkovich indenter.

In addition, the total thickness (unit: mm) of the glass substrate refers to a value obtained by summing the thicknesses of two glass substrates that are used in the liquid crystal cell.

[Pressure Sensitive Adhesive and Adhesive]

In the liquid crystal display device of the present invention, the above-described front-side polarizing plate, rear-side polarizing plate, and liquid crystal cell may be attached together via a pressure sensitive adhesive or an adhesive.

The pressure sensitive adhesive or the adhesive that is used in the present invention is not particularly limited, and an ordinarily-used pressure sensitive adhesive (for example, an acrylic pressure sensitive adhesive or the like) or adhesive (for example, a polyvinyl alcohol-based adhesive or the like) can be used.

In addition, in a case in which an arbitrary pressure sensitive adhesive layer or adhesive layer is used, the thickness thereof is not particularly limited, but is preferably in a range of 1 to 25 μm and more preferably in a range of 5 to 20 μm. Particularly, the thickness thereof is still more preferably 15 μm or less and particularly preferably in a range of 5 to 15 μm since the hardness of the polarizing plate can be improved.

Meanwhile, in a case in which these pressure sensitive adhesive and adhesive are included, the thicknesses of these layers are included in the distance T1 from the surface of the front-side polarizer on the liquid crystal cell side to the surface of the liquid crystal cell on the front-side polarizer side in the front-side polarizing plate and in the distance T2 from the surface of the rear-side polarizer on the liquid crystal cell side to the surface of the liquid crystal cell on the rear-side polarizer side in the rear-side polarizing plate.

EXAMPLES

Hereinafter, the present invention will be described in more detail on the basis of the following examples. Materials, used amounts, proportions, processing contents, processing orders, and the like described in the following examples can be appropriately altered within the purport of the present invention. Therefore, the scope of the present invention should not be limitedly interpreted by the examples described below.

[Polymer Film 1]
<Production of Core Layer Cellulose Acylate Dope>

The following composition was injected into a mixing tank and was stirred so as to dissolve individual components, thereby preparing a cellulose acetate solution.

| | |
|---|---|
| Cellulose acetate having an acetyl substitution degree of 2.88 | 100.0 parts by mass |
| Ester oligomer A | 10.0 parts by mass |
| Polarizing sheet durability improver (compound having the following structural formula) | 4.0 parts by mass |
| Ultraviolet absorber (compound having the following structural formula) | 2.0 parts by mass |
| Methylene chloride (first solvent) | 430.0 parts by mass |
| Methanol (second solvent) | 64.0 parts by mass |

The ester oligomer A is an aromatic ester oligomer and includes a repeating unit derived from dicarboxylic acid and a repeating unit derived from a diol at a ratio of 1:1. In addition, regarding the repeating unit derived from dicarboxylic acid, when the molar ratio of the repeating unit derived from aliphatic dicarboxylic acid is represented by m, and the molar ratio of the repeating unit derived from an aromatic dicarboxylic acid is represented by n, m was set to 0, and n was set to 10.

Here, phthalic acid was used as the aromatic dicarboxylic acid, and ethylene glycol was used as the diol.

In addition, both terminals of the ester oligomer were sealed with acetyl groups. The hydroxyl number of the ester oligomer was 0 mgKOH/g, and the number-average molecular weight was 1,000.

These results are shown in Table 1.

TABLE 1

| | | Dicarboxylic acid | | | | | |
|---|---|---|---|---|---|---|---|
| | | Aliphatic (m) | Aromatic (n) | | | Hydroxyl | |
| Kind of ester oligomer | | Adipic acid | Phthalic acid | Terephthalic acid | Diol | Terminal | number (mgKOH/g) | Molecular weight |
| A | | 0 | 10 | 0 | Ethylene glycol | Acetyl group | 0 | 1,000 |

Polarizing Sheet Durability Improver

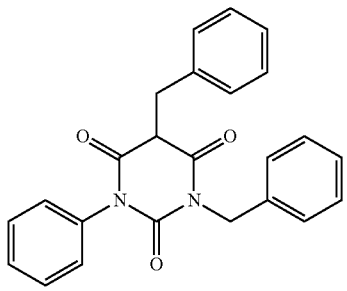 [SMILES: O=C1C(Cc2ccccc2)C(=O)N(c2ccccc2)C(=O)N1Cc1ccccc1]

Ultraviolet Absorber

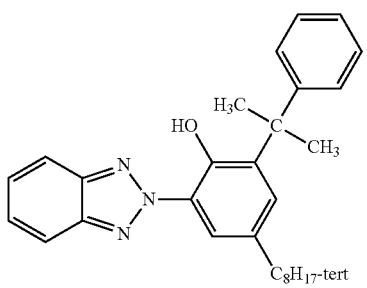

<Production of Outside Layer Cellulose Acylate Dope>

The following matting agent solution (10 parts by mass) was added to the above-described core layer cellulose acylate dope (90 parts by mass), thereby preparing an outside layer cellulose acetate solution.

| | |
|---|---|
| Silica particles having an average particle size of 20 nm (AEROSIL R972, manufactured by the Nippon Aerosil Co.) | 2.0 parts by mass |
| Methylene chloride (first solvent) | 76.0 parts by mass |
| Methanol (second solvent) | 11.0 parts by mass |
| Core layer cellulose acylate dope | 1.0 parts by mass |

<Production of Cellulose Acylate Film>

Three layers of the core layer cellulose acylate dope layer and the outside layer cellulose acylate dope layers on both sides of the core layer cellulose acylate dope layer were cast from a casting opening onto a drum (20° C.) at the same time. The film was peeled off in a state in which the solvent content ratio was approximately 20% by mass, both ends of the film in the width direction were fixed using tenter clips, and the film was dried while being stretched 1.1 times in the horizontal direction in a state in which the content of the residual solvent was in a range of 3% to 15%. After that, the film was further dried by being transported between rolls in a thermal treatment device, thereby producing a cellulose acylate film (polymer film 1) having a thickness of 40 μm.

[Polymer Film 2]

Methyl methacrylate (MMA) (41.5 parts by mass), methyl 2-(hydroxymethyl)acrylate (MHMA) (6 parts by mass), 2-[2'-hydroxy-5'-(methacryloyloxyethyl) phenyl]-2H-benzotriazole (manufactured by Otsuka Chemical Co., Ltd., trade name: RUVA-93) (2.5 parts by mass), toluene (50 parts by mass) as a polymerization solvent, an antioxidant (manufactured by ADEKA, ADEKASTAB 2112) (0.025 parts by mass), and n-dodecyl mercaptan (0.025 parts by mass) as a chain transfer agent were prepared in a reaction kettle having an inner capacity of 30 L which was equipped with a stirring device, a temperature sensor, a cooling pipe, and a nitrogen introduction pipe and were heated to 105° C. while causing nitrogen to flow among the components. When reflux began due to the heating, t-amylperoxy-isononanoate (manufactured by ARKEMA Yoshitomi, Ltd., trade name: LUPEROX 570) (0.05 parts by mass) was added thereto as a polymerization initiator, the solution was polymerized under a reflux of approximately 105° C. to 110° C. while adding t-amylperoxyisononanoate (0.10 parts by mass) dropwise thereto over three hours, and furthermore, the solution was aged for four hours.

Next, 2-ethylhexyl phosphate (manufactured by Sakai Chemical Industry Co., Ltd., Phoslex A-8) (0.05 parts by mass) was added to the obtained polymerized solution as a catalyst for a cyclization condensation reaction (cyclization catalyst), a cyclization condensation reaction was caused for two hours under a reflux of approximately 90° C. to 110° C., then, the polymerized solution was heated for 30 minutes using an autoclave (240° C.), and the cyclization condensation reaction was further continued. Next, CGL777MPA (manufactured by Ciba Specialty Chemicals) (0.94 parts by mass) was mixed into the polymerized solution for which the reaction had been completed as an ultraviolet absorber.

Next, the obtained polymerized solution was introduced into a vent-type screw biaxial extruder (φ=50.0 mm, L/D=30) which had a barrel temperature of 240° C. a rotation speed of 100 rpm, a degree of decompression in a range of 13.3 to 400 hPa (10 to 300 mmHg), one rear bent and four front bents (referred to as first, second, third, and fourth bent from the upstream side), and a leaf disc-type polymer filter (filtration accuracy: 5μ, filtration area: 1.5 m$^2$) disposed at the distal end portion at a treatment rate of 45 kg/hour in terms of the resin amount and was devolatilized. At this time, a mixed solution of an antioxidant and a cyclization catalyst-devitalizing agent which had been separately prepared was injected at an injection rate of 0.68 kg/hour through the back of the first bent, and ion exchange water was injected at an injection rate of 0.22 kg/hour through the back of the third bent, respectively.

As the mixed solution of an antioxidant and a cyclization catalyst-devitalizing agent, a solution obtained by dissolving an antioxidant (SUMILIZER GS manufactured by Sumitomo Chemical Co., Ltd.) (50 parts by mass) and zinc octoate (manufactured by Nihon Kagaku Sangyo co., Ltd., NIKKA OCTHIX zinc 3.6%) (35 parts by mass) as a devitalizing agent in toluene (200 parts by mass) was used.

Next, after the completion of devolatilizing, the resin in a thermally-molten state which remained in the extruder was discharged from the distal end of the extruder while being filtered using a polymer filter and was pelletized using a pelletizer, thereby obtaining pellets of a transparent resin composition including an acrylic resin having a lactone ring structure in the main chain and an ultraviolet absorber. The weight-average molecular weight of the resin was 145,000, and the glass transition temperatures (Tg) of the resin and the resin composition were 122° C.

The pellets of the transparent resin composition including an acrylic resin having a lactone ring structure in the main chain and an ultraviolet absorber which had been produced above were melted and extruded from a coat hanger-type T die using a biaxial extruder, thereby producing an acrylic polymer film (polymer film 2) having a thickness of 40 μm.

[Polymer Film 3]

As a polymer film 3, a commercially available cellulose acylate film TG40 (manufactured by Fujifilm Corporation) was used. Meanwhile, the thickness of the polymer film 3 was 41 μm.

[Polymer Film 4]

(1) Preparation of Dope (Preparation of Cellulose Acylate Solution)

The following composition was injected into a mixing tank, was stirred so as to dissolve individual components, furthermore, was heated to 90° C. for approximately 10 minutes, and then was filtered using a paper filter having an average pore diameter of 34 μm and a sintered metal filter having an average pore diameter of 10 μm.

Cellulose Acylate Solution

| | |
|---|---|
| Cellulose acetate having an acetyl substitution degree of 2.88 | 100.0 parts by mass in total |
| Ester oligomer B | 15.0 parts by mass |
| Methylene chloride (first solvent) | 451.0 parts by mass |
| Methanol (second solvent) | 39.0 parts by mass |

TABLE 2

| | Polycondensed ester | | | | | |
|---|---|---|---|---|---|---|
| Kind of ester oligomer | Dicarboxylic acid component | Diol component | | | Hydroxyl number [mgKOH/g] | Molecular weight |
| | AA unit | EG unit | PG unit | Terminal | | |
| B | 100 | 70 | 30 | Acetyl | 112 | 1,000 |

(In Table 2 above, AA represents adipic acid, EG represents ethylene glycol, and PG represents 1,2-propylene glycol.)

(Preparation of Matting Agent Dispersion Liquid)

Next, the following composition including the cellulose acylate solution produced using the above-described method was injected into a disperser, thereby preparing a matting agent dispersion liquid.

Matting Agent Dispersion Liquid

| | |
|---|---|
| Silica particles having an average particle size of 20 nm (AEROSIL R972, manufactured by the Nippon Aerosil Co.) | 0.2 parts by mass |
| Methylene chloride (first solvent) | 72.4 parts by mass |
| Methanol (second solvent) | 10.8 parts by mass |
| Cellulose acylate solution having an acetyl substitution degree of 2.88 | 10.3 parts by mass |

(Preparation of Dope for Membrane Production)

The above-described cellulose acylate solution (100 parts by mass) and an amount of the matting agent dispersion liquid at which the content of the silica particles reaches 0.20 parts by mass of the content of a cellulose acylate resin were mixed together, thereby preparing a dope for membrane production.

(2) Production of Membrane

The above-described dope for membrane production was cast using a band casting machine. Meanwhile, the band was a SUS band.

A web (film) obtained by means of casting was peeled off from the band and then was dried at 100° C. for 20 minutes in a tenter device using the tenter device with which the web was transported with both ends thereof clipped with clips.

After that, furthermore, the web was transported into a drying zone at 120° C. and was dried, thereby obtaining a film (polymer film 4) having a thickness of 25 μm.

Meanwhile, the drying temperature mentioned herein refers to the membrane surface temperature of the film.

[Polymer Film 5]

As a polymer film 5, a norbornene-based optical compensation film that was used in a commercially available liquid crystal television UN46C7000 manufactured by Samsung was peeled off and used. The membrane thickness of the polymer film 5 was 52 μm.

[Polymer Film 6]

ZF14-100 (manufactured by Zeon Corporation) was stretched 30% in a film transportation direction and 50% in a direction orthogonal to the film transportation direction at 150° C., was held while maintaining the width thereof for several seconds, and was released after tension in the width direction was relaxed, thereby obtaining a film (polymer film 6) having a thickness of 47 μm.

[Functional Layer (Hereinafter, Referred to as "Polymer Film 7")]

(1) Production of Transport Support (Preparation of Cellulose Acylate Solution C01)

The following composition was injected into a mixing tank and was stirred so as to dissolve individual components, thereby preparing a cellulose acylate solution. The amount of the solvents (methylene chloride and methanol) was appropriately adjusted so that the concentration of solid contents in the cellulose acylate solution reached 22% by mass.

| | |
|---|---|
| Cellulose acetate (degree of substitution: 2.43) | 100.0 parts by mass |
| The following compound C | 19.0 parts by mass |
| The following compound D | 5.0 parts by mass |
| Methylene chloride | 365.5 parts by mass |
| Methanol | 54.6 parts by mass |

(Preparation of Cellulose Acylate Solution C02)

The following composition was injected into a mixing tank and was stirred so as to dissolve individual components, thereby preparing a cellulose acylate solution. The amount of the solvents (methylene chloride and methanol) was appropriately adjusted so that the concentration of solid contents in the cellulose acylate solution reached 22% by mass.

| | |
|---|---|
| Cellulose acetate (degree of substitution: 2.81) | 100.0 parts by mass |
| The following compound C | 19.0 parts by mass |
| Methylene chloride (first solvent) | 365.5 parts by mass |
| Methanol (second solvent) | 54.6 parts by mass |

Three layer co-casting was performed using a band casting machine so that a core layer having a membrane thickness of 62 μm was formed using the cellulose acylate solution C01 and a skin A layer having a membrane thickness of 2 μm was formed using the cellulose acylate solution C02 respectively. The obtained thickness was 66 μm. Subsequently, the obtained web (film) was peeled off from the band, was sandwiched between clips, and was cross-direction-stretched using a tenter. The stretching temperature and the stretching ratio were set to 193° C. and 73% respectively. After that, the film was removed from the clips and was dried at 130° C. for 20 minutes, thereby obtaining a film. The thickness of the obtained film was 38 μm.

Compound C

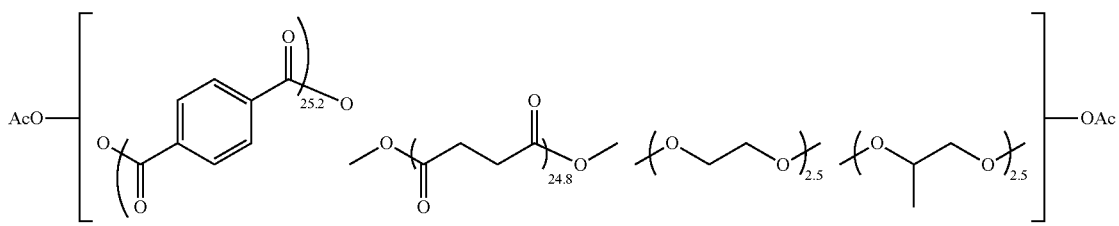

In the formula, Ac represents an acetyl group.

The compound C represents a terephthalic acid/succinic acid/ethylene glycol/propylene glycol copolymer (copolymerization ratio [mole %]=27.5/22.5/25/25).

The compound C is a non-phosphoric acid ester-based compound and a retardation developing agent. The terminals of the compound C are sealed with acetyl groups.

Compound D

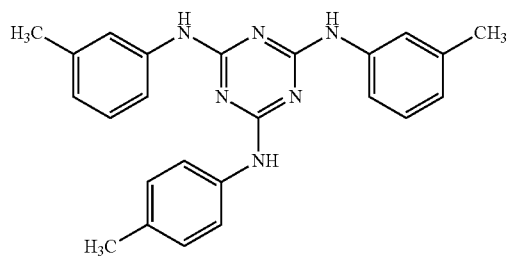

(2) Formation of Alignment Membrane

Two kinds of the following acrylic compound (pentaerythritol tetraacrylate (PETA)/glycerin monomethacrylate (GLM)=100/50 (mass ratio)) (100 parts by mass), a photopolymerization initiator (IRGACURE 127, manufactured by Ciba Specialty Chemicals) (4 parts by mass), and a solvent (methyl acetate: methyl isobutyl ketone=35:65 (mass ratio)) were mixed together, thereby preparing a composition for forming an alignment membrane so that the concentration of solid contents reached 60%. The composition for forming an alignment membrane prepared as described above was applied onto a support using a wire bar coater #1.6 so that the coating amount reached 8.4 ml/m², was dried at 40° C. for 0.5 minutes, and then was crosslinked by being irradiated with 54 mJ of ultraviolet rays (UV) for by being irradiated with 54 mJ of ultraviolet rays (UV) for 30 seconds at 30° C. using a 120 W/cm high-pressure mercury lamp.

(3) Formation of Liquid Crystal Layer (Optically Anisotropic Layer)

An optically anisotropic layer coating liquid described below was applied onto the alignment membrane using a #3.2 wire bar so that the coating amount reached 6 ml/m². This coating was attached to a metal frame and was heated in a constant-temperature tank at 100° C. for two minutes, thereby aligning a rod-like liquid crystal compound (homeotropic alignment). Next, the rod-like liquid crystal compound was cooled to 50° C. and then was irradiated with an irradiance level of 310 mJ/cm² of ultraviolet rays using a 160 W/cm air-cooling metal halide lamp (manufactured by eye Graphic Co., Ltd.) at an oxygen concentration of approximately 0.1% under nitrogen purge, 40° C. (the UV temperature during fixation), and an illuminance of 190 mW/cm², thereby curing a coated layer. After that, the cured layer was dried at 70° C., thereby producing a functional layer (polymer film 7) having a thickness of 40 μm.

Optically Anisotropic Layer Coating Liquid (Composition)

| | |
|---|---|
| Liquid crystal compound (a mixture including a liquid crystal compound B01 and a liquid crystal compound B02 at a mass ratio of 90:10) | 100 parts by mass |
| Vertical alignment agent (S01) | 1 part by mass |
| Adhesion improver | 0.25 parts by mass |
| Levelling agent | 0.8 parts by mass |
| Polymerization initiator | 3 parts by mass |
| Sensitizer | 1 part by mass |
| Acrylic bonding agent | 8 parts by mass |
| Solvent (methyl ethyl ketone/cyclohexane = 86/14 (% by mass)) | An amount at which the concentration of solid contents reaches 33% by mass |

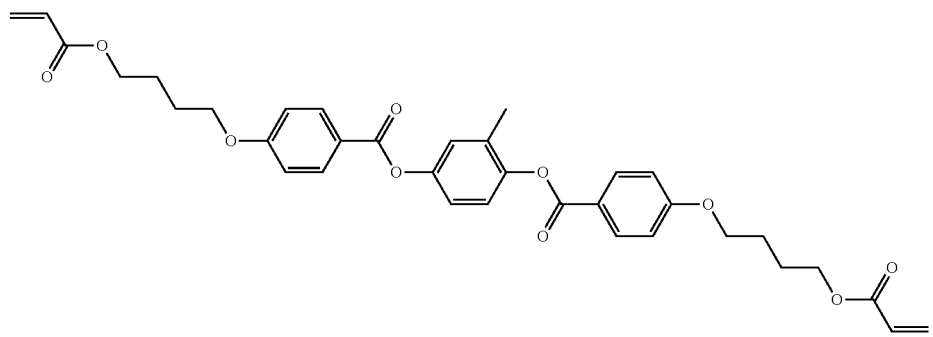 [SMILES: C=CC(=O)OCCCCOc1ccc(C(=O)Oc2ccc(OC(=O)c3ccc(OCCCCOC(=O)C=C)cc3)c(C)c2)cc1]

-continued
B01
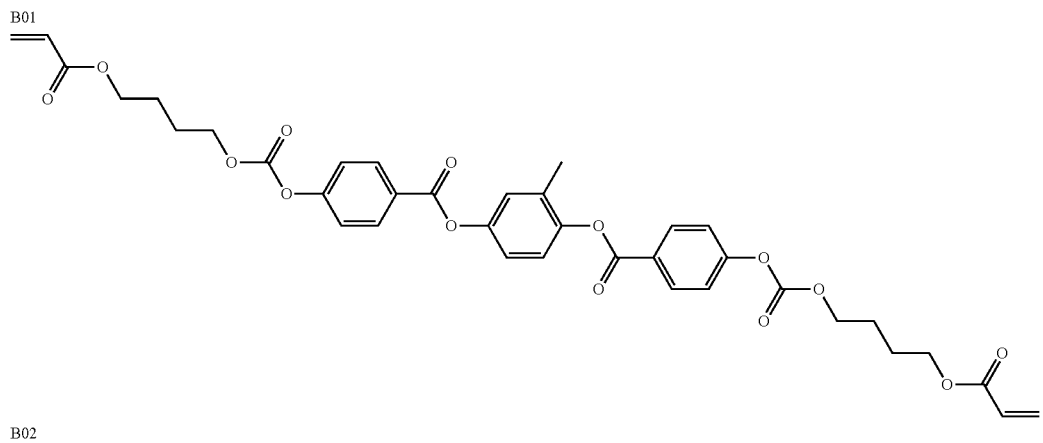
B02
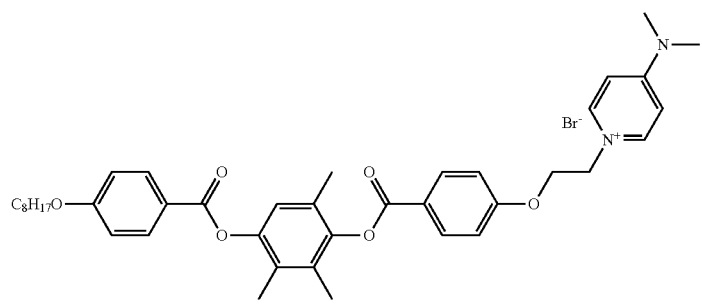
S01
Adhesion improver
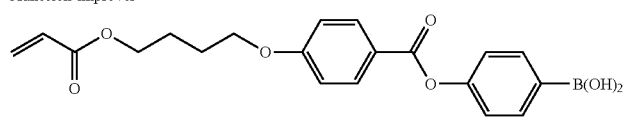
Levelling agent
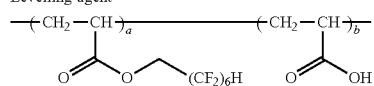
(a:b) = 90:10)
Polymerization initiator
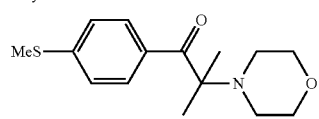
(Me represents a methyl group.)
Sensitizer
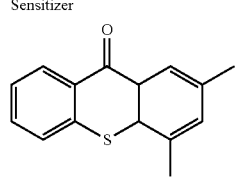
Acrylic bonding agent
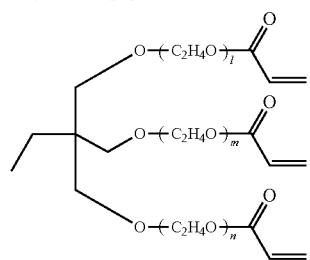
l + m + n = 3

[Polymer Film 8]
{Formation of Hardcoat 1}
As a coating liquid for forming a hardcoat layer, a composition for forming a hardcoat layer (hardcoat 1) shown in the following table was prepared.

TABLE 3

| | Monomer | | | | UV initiator | | |
|---|---|---|---|---|---|---|---|
| | Monomer 1 | Monomer 2 | Monomer 1/ Monomer 2 | Total addition amount [parts by mass] | Kind | Addition amount [parts by mass] | Solvent |
| Hardcoat 1 | Pentaerythritol triacrylate | Pentaerythritol tetraacrylate | 3/2 | 53.5 | UV initiator 1 | 1.5 | Ethyl acetate |

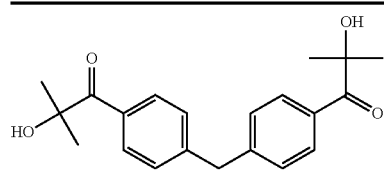

UV initiator 1

The prepared hardcoat 1 was applied onto one surface of the polymer film 1 produced above, then, was dried at 100° C. for 60 seconds, was irradiated with UV at 1.5 kW and 300 mJ under a condition of 0.1% or less of nitrogen, and was cured, thereby forming a hardcoat layer having a thickness of 5 µm and producing a polymer film 8 having a thickness of 45 µm.

[Polymer Film 9]
A polymer film 9 was produced using the same method as in the production of the polymer film 4 except for the fact that the membrane thickness was set to 14 µm.

[Production of Polarizer 1]
A polyvinyl alcohol (PVA) film having a thickness of 45 µm was dyed by being immersed in an iodine aqueous solution having an iodine concentration of 0.05% by mass at 30° C. for 60 seconds, subsequently, was vertically stretched to be five times as long as the original length while being immersed in a boric acid aqueous solution having a boric acid concentration of 4% by mass for 60 seconds, and then was dried at 50° C. for four minutes, thereby obtaining a polarizer having a thickness of 15 µm.

[Production of Polarizers 2 to 5]
In the production of the polarizer 1, the thickness of the polyvinyl alcohol film, the stretching ratio, and the immersion duration were appropriately changed, thereby producing a polarizer 2 which had a thickness (17 µm) that was 1.13 times as thick as the thickness of the polarizer 1, a polarizer 3 which had the same thickness (15 µm) as the thickness of the polarizer 1 and was immersed for a changed immersion duration of 50 seconds during vertical stretching, a polarizer 4 which had the same thickness (15 µm) as the thickness of the polarizer 1 and was vertically stretched at a changed ratio of 4.5, and a polarizer 5 which had a thickness (13 µm) that was 0.87 times as thick as the thickness of the polarizer 1.

[Production of Polarizing Plate 1]
<Saponification Treatment of Polymer Film>
A saponification treatment was performed on the polymer film 1 in the following order. The polymer film was immersed in 2.3 mol/L of sodium hydroxide aqueous solution at 55° C. for three minutes. The polymer film was washed in a water washing tank at room temperature and was neutralized at 30° C. using 0.05 mol/L of sulfuric acid. Again, the polymer film was washed in the water washing tank at room temperature and, furthermore, was dried using hot air (100° C.).

<Attachment of Polarizer and Polymer Film>
The saponified polymer film 1 was attached to one side of the previously-produced polarizer 1 using a polyvinyl alcohol-based adhesive, thereby producing a polarizing plate. Meanwhile, the polymer film was attached to the polarizer so that the transportation direction of the polymer film 1 coincided with the stretching direction of the polarizer 1.

<Hardcoat (HC) Layer>
A curable resin composition described below was applied onto a surface of the polarizer 1 opposite to the surface to which the polymer film 1 had been attached in the produced polarizing plate using a die coating method in which the slot die described in Example 1 of JP2006-122889A under a condition of a transportation rate of 24 m/minute and was dried at 60° C. for 60 seconds.

After that, furthermore, the coated layer was cured by being irradiated with an irradiance level of 390 mJ/cm² of ultraviolet rays using a 160 W/cm air-cooling metal halide lamp (manufactured by eye Graphic Co., Ltd.) (at an oxygen concentration of approximately 0.1%) under nitrogen purge at an illuminance of 400 mW/cm² and was coiled.

Meanwhile, the coating amount was adjusted so that the membrane thickness of the cured layer (hardcoat layer) reached 2 µm.

(Curable Resin Composition)

| | |
|---|---|
| A-TMMT [manufactured by Shin-Nakamura Chemical Co., Ltd.] | 100.0 parts by mass |
| The following compound 1 | 0.5 parts by mass |
| IRGACURE 127: polymerization initiator manufactured by Ciba Specialty Chemicals] | 3.0 parts by mass |
| Surfactant (the following compound 3) | 0.2 parts by mass |
| Methyl ethyl ketone | 103.7 parts by mass |

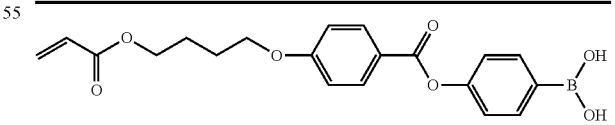

Compound 1

As the surfactant, a compound 3 shown in Table 4 below was used. The repeating units shown in Table 4 below refer to copolymers having a content ratio (mole %) in the following table. The weight-average molecular weight (Mw) is a measurement value of GPC measurement (polystyrene-equivalent).

TABLE 4

| Structure | Compound 2 | Compound 3 | Compound 4 |
|---|---|---|---|
| ![acrylate]—O—CH2CH2(CF2)5F | | | 32.5 |
| ![acrylate]—O—CH2CH2(CF2)5H | | 90 | |
| ![acrylate]—O—CH2(CF2)5H | | | 90 |
| ![acrylate]—O—[CH(CH3)CH2O]6—H | 10 | | 67.5 |
| ![acrylate]—OH | | 10 | |
| Weight-average molecular weight (Mw) | 13,000 | 16,000 | 16,000 |

[Production of Polarizing Plate 2]

A polarizing plate 2 was produced using the same method as for the polarizing plate 1 except for the fact that the thickness of the hardcoat layer (cured layer) reached 5 μm in the production of the polarizing plate 1.

[Production of Polarizing Plate 3]

A polarizing plate 3 was produced using the same method as for the polarizing plate 1 except for the fact that the thickness of the hardcoat layer (cured layer) reached 10 μm in the production of the polarizing plate 1.

[Production of Polarizing Plate 4]

A polarizing plate 4 was produced using the same method as for the polarizing plate 1 except for the fact that the polarizer 2 was used as the polarizer in the production of the polarizing plate 1

[Production of Polarizing Plate 5]

A polarizing plate 5 was produced using the same method as for the polarizing plate 1 except for the fact that the hardcoat layer was not formed in the production of the polarizing plate 1.

[Production of Polarizing Plate 6]

A polarizing plate 6 was produced using the same method as for the polarizing plate 1 except for the fact that the polarizer 3 was used as the polarizer in the production of the polarizing plate 1.

[Production of Polarizing Plate 7]

A polarizing plate 7 was produced using the same method as for the polarizing plate 1 except for the fact that the polarizer 4 was used as the polarizer in the production of the polarizing plate 1.

[Production of Polarizing Plate 8]

A polarizing plate 8 was produced using the same method as for the polarizing plate 1 except for the fact that the polymer film 4 which had been saponified using the same method as for the polymer film 1 was attached instead of forming the hardcoat layer in the production of the polarizing plate 1.

[Production of Polarizing Plate 9]

A polarizing plate 9 was produced using the same method as for the polarizing plate 1 except for the fact that the polymer film 7 which had been saponified using the same method as for the polymer film 1 was attached instead of forming the hardcoat layer in the production of the polarizing plate 1.

[Production of Polarizing Plate 10]

A polarizing plate 10 was produced using the same method as for the polarizing plate 9 except for the fact that the polarizer 5 was used as the polarizer in the production of the polarizing plate 9.

[Production of Polarizing Plate 11]

A polarizing plate 11 was produced using the same method as for the polarizing plate 5 except for the fact that the polymer film 2 was attached using the following method instead of the polymer film 1, and the polarizer 2 was used as the polarizer in the production of the polarizing plate 5.

<Attachment Method>

The polymer film 2 was attached to the polarizer 2 using the following epoxy-based adhesive composition, and then the adhesive composition was cured by being irradiated using a metal halide lamp so that the integrated light amount at a wavelength in a range of 320 to 400 nm reached 600 mJ/cm$^2$, thereby attaching the polymer film 2 to one side of the polarizer 2.

(Epoxy-based Adhesive Composition)

| | |
|---|---|
| 3,4-Epoxycyclohexylmethyl 3,4-epoxycyclohexane carboxylate | 40 parts by mass |
| Bisphenol A-type epoxy resin | 60 parts by mass |
| Diphenyl[4-(phenylthio)phenyl]sulfonium hexafluoroantimonate (cationic polymerization initiator) | 4.0 parts by mass |
| Benzoin methyl ether (photosensitizer) | 1.0 parts by mass |

The epoxy equivalent of the above-described 3,4-epoxycyclohexylmethyl 3,4-epoxycyclohexane carboxylate was 126 g/eq, and the epoxy equivalent of the bisphenol A-type epoxy resin was 187 g/eq.

In addition, the total chlorine amount of the epoxy-based adhesive composition was 840 ppm, and the viscosity measured at 25° C. and 60 rpm using a B-type viscometer was 3,000 mPa·s.

Meanwhile, the total chlorine amount of the epoxy-based adhesive composition was measured using a titration method in which a silver nitrate solution was used on the basis of JIS K 7243-3 (ISO 21627-3).

[Production of Polarizing Plate 12]

A polarizing plate 12 was produced using the same method as for the polarizing plate 1 except for the fact that the polymer film 3 was attached instead of the polymer film 1, and a liquid crystal layer was formed using the following method instead of forming the hardcoat layer in the production of the polarizing plate 1.

<Formation of Liquid Crystal Layer Made of Horizontally-aligned Disc-like Liquid Crystal Compound>

The following compounds 3-1 to 3-6 were dissolved in methyl ethyl ketone, thereby preparing a coating liquid so that the concentration of solid contents reached 36.2%.

| | |
|---|---|
| Polymerizable liquid crystal compound 3-1 | 91.0 parts by mass |
| Compound 3-2 | 9.0 parts by mass |
| Polymerization initiator: Compound 3-3 | 3.0 parts by mass |
| Polymerization initiator: Compound 3-4 | 1.0 parts by mass |
| Fluorine-containing surfactant: Compound 3-5 | 0.8 parts by mass |
| Adhesion improver: Compound 3-6 | 0.5 parts by mass |

(Compound 3-1)

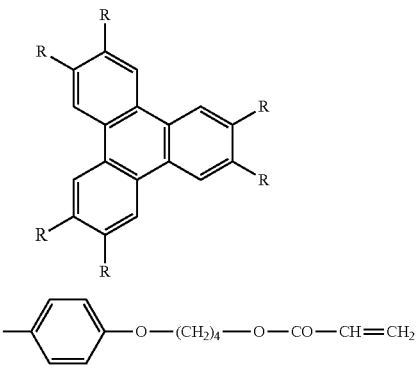

R: —O—CO—<phenyl>—O—(CH$_2$)$_4$—O—CO—CH=CH$_2$ (Compound 3-2)

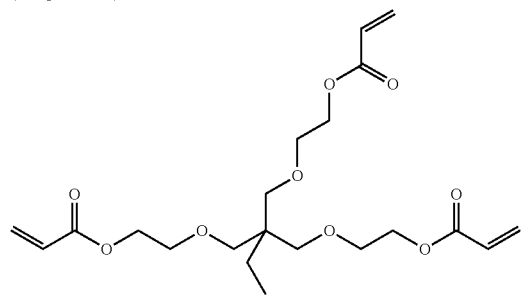

(Compound 3-3)

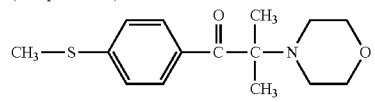

(Compound 3-4)

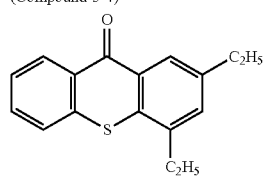

(Compound 3-5)

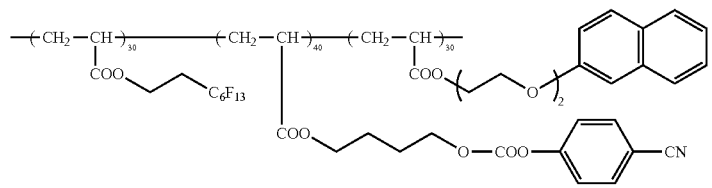

(Compound 3-6)

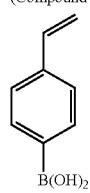

The coating liquid was applied to a surface of the polarizer 2 on the polarizer side to which the polymer film 3 produced above had been attached using a #4.4 wire bar and was dried.

The coating was heated at 70° C. for 90 seconds, thereby aligning a disc-like liquid crystal compound. After that, the disc-like liquid crystal compound was polymerized by being immediately irradiated with 290 mJ/cm$^2$ of ultraviolet rays under a temperature condition of 70° C., and the alignment state was fixed, thereby producing a polarizing plate 12. Meanwhile, the thickness of the formed liquid crystal layer (optically anisotropic layer) was 2.1 μm.

[Production of Polarizing Plate 13]

A polarizing plate 13 was produced using the same method as for the polarizing plate 11 except for the fact that the polarizer 1 was used instead of the polarizer 2 in the production of the polarizing plate 11.

[Production of Polarizing Plate 14]

A polarizing plate 14 was produced using the same method as for the polarizing plate 12 except for the fact that the polarizer 1 was used instead of the polarizer 2 in the production of the polarizing plate 12.

[Production of Polarizing Plate 15]

A polarizing plate 15 was produced using the same method as for the polarizing plate 12 except for the fact that the polarizer 3 was used instead of the polarizer 2 in the production of the polarizing plate 12.

[Production of Polarizing Plate 16]

A polarizing plate 16 was produced using the same method as for the polarizing plate 12 except for the fact that the polarizer 4 was used instead of the polarizer 2 in the production of the polarizing plate 12.

[Production of Polarizing Plate 17]

A polarizing plate 17 was produced using the same method as for the polarizing plate 1 except for the fact that the polymer film 3 was used instead of the polymer film 1, and the polymer film 5 was attached using the same method as for the polymer film 2 in the polarizing plate 11 instead of forming the hardcoat layer in the production of the polarizing plate 1.

[Production of Polarizing Plate 18]

A polarizing plate 18 was produced using the same method as for the polarizing plate 1 except for the fact that the polymer film 2 was used instead of the polymer film 1, the polymer film 6 was used instead of forming the hardcoat layer, and both polymer films were attached using the same method as for the polymer film 2 in the polarizing plate 11 in the production of the polarizing plate 1.

[Production of Polarizing Plate 19]

A polarizing plate 19 was produced using the same method as for the polarizing plate 18 except for the fact that the polarizer 5 was used instead of the polarizer 1 in the production of the polarizing plate 18.

[Production of Polarizing Plate 20]

A polarizing plate 20 was produced using the same method as for the polarizing plate 19 except for the fact that the polymer film 8 was used instead of the polymer film 2, and the polymer film 9 was used instead of the polymer film 6 in the production of the polarizing plate 19.

[Production of Polarizing Plate 21]

A polarizing plate 21 was produced using the same method as for the polarizing plate 10 except for the fact that the polymer film 8 was used instead of the polymer film 1 in the production of the polarizing plate 10.

[Production of Polarizing Plate 22]

A polarizing plate 22 was produced using the same method as for the polarizing plate 1 except for the fact that the polymer film 8 was used instead of the polymer film 1, and the polarizer 5 was used instead of the polarizer 1 in the production of the polarizing plate 1.

[Production of Polarizing Plate 23]

A polarizing plate 23 was produced using the same method as for the polarizing plate 20 except for the fact that the polymer film 4 was used instead of the polymer film 9 in the production of the polarizing plate 20.

The outer-side polymer films, the inner-side functional layers, and the kinds and thicknesses of the polarizers in the produced polarizing plates 1 to 23 are shown in Table 5 below.

TABLE 5

| | Outer side | | Inner side | | Polarizer | |
|---|---|---|---|---|---|---|
| | Kind | Thickness (μm) | Kind | Thickness (μm) | Kind | Thickness (μm) |
| Polarizing plate 1 | Polymer film 1 | 40 | Hardcoat layer | 2 | Polarizer 1 | 15 |
| Polarizing plate 2 | Polymer film 1 | 40 | Hardcoat layer | 5 | Polarizer 1 | 15 |
| Polarizing plate 3 | Polymer film 1 | 40 | Hardcoat layer | 10 | Polarizer 1 | 15 |
| Polarizing plate 4 | Polymer film 1 | 40 | Hardcoat layer | 2 | Polarizer 2 | 17 |
| Polarizing plate 5 | Polymer film 1 | 40 | None | — | Polarizer 1 | 15 |
| Polarizing plate 6 | Polymer film 1 | 40 | Hardcoat layer | 2 | Polarizer 3 | 15 |
| Polarizing plate 7 | Polymer film 1 | 40 | Hardcoat layer | 2 | Polarizer 4 | 15 |
| Polarizing plate 8 | Polymer film 1 | 40 | Polymer film 4 | 25 | Polarizer 1 | 15 |
| Polarizing plate 9 | Polymer film 1 | 40 | Polymer film 7 | 40 | Polarizer 1 | 15 |
| Polarizing plate 10 | Polymer film 1 | 40 | Polymer film 7 | 40 | Polarizer 5 | 13 |
| Polarizing plate 11 | Polymer film 2 | 40 | None | — | Polarizer 2 | 17 |
| Polarizing plate 12 | Polymer film 3 | 41 | Liquid crystal layer | 2.1 | Polarizer 2 | 17 |
| Polarizing plate 13 | Polymer film 2 | 40 | None | — | Polarizer 1 | 15 |
| Polarizing plate 14 | Polymer film 3 | 41 | Liquid crystal layer | 2.1 | Polarizer 1 | 15 |

TABLE 5-continued

| | Outer side | | Inner side | | Polarizer | |
|---|---|---|---|---|---|---|
| | Kind | Thickness (μm) | Kind | Thickness (μm) | Kind | Thickness (μm) |
| Polarizing plate 15 | Polymer film 3 | 41 | Liquid crystal layer | 2.1 | Polarizer 3 | 15 |
| Polarizing plate 16 | Polymer film 3 | 41 | Liquid crystal layer | 2.1 | Polarizer 4 | 15 |
| Polarizing plate 17 | Polymer film 3 | 41 | Polymer film 5 | 52 | Polarizer 1 | 15 |
| Polarizing plate 18 | Polymer film 2 | 40 | Polymer film 6 | 47 | Polarizer 1 | 15 |
| Polarizing plate 19 | Polymer film 2 | 40 | Polymer film 6 | 47 | Polarizer 5 | 13 |
| Polarizing plate 20 | Polymer film 8 | 45 | Polymer film 9 | 14 | Polarizer 5 | 13 |
| Polarizing plate 21 | Polymer film 8 | 45 | Polymer film 7 | 40 | Polarizer 5 | 13 |
| Polarizing plate 22 | Polymer film 8 | 45 | Hardcoat layer | 2 | Polarizer 5 | 13 |
| Polarizing plate 23 | Polymer film 8 | 45 | Polymer film 4 | 25 | Polarizer 5 | 13 |

Examples 1 to 13 and Comparative Examples 1 and 2

The respective produced polarizing plates were used on the front side and rear side of the liquid crystal cell in combinations shown in Table 6 below, thereby producing liquid crystal display devices.

Specifically, two polarizing plates were peeled off from a commercially available iPad tablet (manufactured by Apple Inc.), and the polarizing plate shown in Table 6 below was attached to the front side and the polarizing plate shown in Table 6 below was attached to the rear side respectively via a pressure sensitive adhesive having a thickness shown in Table 6 below so that the inner films were respectively located on the liquid crystal cell side.

A crossed nicol was disposed so that the transmission axis (TD direction) of the polarizing plate on the front side was placed in the longitudinal direction (horizontal direction) and the absorption axis (MD direction) of the polarizing plate on the rear side was placed in the longitudinal direction (horizontal direction). The thickness of a glass substrate that was used in the liquid crystal cell was 0.15 mm, and the modulus of elasticity of the glass substrate was 72 GPa.

The distances D1 from the central portion of the front-side polarizer in the thickness direction to the central portion of the liquid crystal cell in the thickness direction and the distances D2 from the central portion of the rear-side polarizer in the thickness direction to the central portion of the liquid crystal cell in the thickness direction in the produced liquid crystal display devices are shown in Table 6 below. Meanwhile, D1 and D2 were computed while ignoring the thicknesses of the liquid crystal layers in the liquid crystal cells.

Similarly, the distances T1 from the surface of the front-side polarizer on the liquid crystal cell side to the surface of the liquid crystal cell on the front-side polarizer side in the front-side polarizing plate and in the distances T2 from the surface of the rear-side polarizer on the liquid crystal cell side to the surface of the liquid crystal cell on the rear-side polarizer side in the rear-side polarizing plate are shown in Table 6 below.

In addition, for the front-side polarizers and the rear-side polarizers in the respective produced liquid crystal display devices, the values of the thicknesses, the moduli of elasticity (GPa), and the humidity dimensional change ratios (%) measured using the above-described methods are shown in Table 6 below. Meanwhile, as described above, for the moduli of elasticity and humidity dimensional change ratios of the front-side polarizers, the measurement direction of the specimens was set to the longitudinal direction of the display devices, that is, the TD direction of the polarizing plates in the present examples, and, for the moduli of elasticity and humidity dimensional change ratios of the rear-side polarizers, the measurement direction of the specimens was set to the longitudinal direction of the display devices, that is, the MD direction of the polarizing plates in the present examples.

In addition, meanwhile, values obtained by multiplying the Z value computed by multiplying the modulus of elasticity (72 GPa) of the glass substrate in the liquid crystal cell and the total thickness (0.15 mm+0.15 mm) of the glass substrate by 0.034, that is, the values on the right side of Expression (1) described above are shown in Table 6 below.

Examples 14 to 19 and Comparative Examples 3 and 4

The respective produced polarizing plates were used on the front side and rear side of the liquid crystal cell in combinations shown in Table 7 below, thereby producing liquid crystal display devices.

Specifically, two polarizing plates were peeled off from a commercially available VA-type liquid crystal television (39E61 HR manufactured by Skyworth), and the polarizing plate shown in Table 7 below was attached to the front side and the polarizing plate shown in Table 7 below was attached to the rear side respectively via a pressure sensitive adhesive (having a thickness of 20 μm) so that the inner films were respectively located on the liquid crystal cell side. In addition, a crossed nicol was disposed so that the absorption axis (MD direction) of the polarizing plate on the front side was placed in the longitudinal direction (horizontal direction) and the transmission axis (TD direction) of the polarizing plate on the rear side was placed in the longitudinal direction (horizontal direction). The thickness of a glass substrate that was used in the liquid crystal cell was 0.5 mm.

The distances D1 from the central portion of the front-side polarizer in the thickness direction to the central portion of the liquid crystal cell in the thickness direction and the distances D2 from the central portion of the rear-side polarizer in the thickness direction to the central portion of the liquid crystal cell in the thickness direction in the produced liquid crystal display devices are shown in Table 7 below. Meanwhile, D1 and D2 were computed while ignoring the thicknesses of the liquid crystal layers in the liquid crystal cells.

Similarly, the distances T1 from the surface of the front-side polarizer on the liquid crystal cell side to the surface of the liquid crystal cell on the front-side polarizer side in the front-side polarizing plate and in the distances T2 from the surface of the rear-side polarizer on the liquid crystal cell side to the surface of the liquid crystal cell on the rear-side polarizer side in the rear-side polarizing plate are shown in Table 7 below.

In addition, for the front-side polarizers and the rear-side polarizers in the respective produced liquid crystal display devices, the values of the thicknesses, the moduli of elasticity (GPa), and the humidity dimensional change ratios (%) measured using the above-described methods are shown in Table 7 below. Meanwhile, as described above, for the moduli of elasticity and humidity dimensional change ratios of the front-side polarizers, the measurement direction of the specimens was set to the longitudinal direction of the display devices, that is, the MD direction of the polarizing plates in the present examples, and, for the moduli of elasticity and humidity dimensional change ratios of the rear-side polarizers, the measurement direction of the specimens was set to the longitudinal direction of the display devices, that is, the TD direction of the polarizing plates in the present examples.

[Warping Evaluation]

Among the liquid crystal display devices of the examples and the comparative examples which were produced as described above, the liquid crystal display devices of Examples 1 to 13 and Comparative Examples 1 and 2 were left to stand at 50° C. and 1 atmosphere for 90 seconds and then were put back into a room of 25° C. and a relative humidity of 60%, the warping amounts of panels after three days were evaluated, and the warping amounts after autoclaving were evaluated.

In addition, the liquid crystal display devices were thermally treated for three hours by being dried at 80° C. and were put back into a room of 25° C. and a relative humidity of 60%, the warping amounts of panels after three days were evaluated, and the warping amounts after the thermal treatment were evaluated.

Meanwhile, the liquid crystal display devices of Examples 14 to 19 and Comparative Examples 3 and 4 were left to stand at 50° C. and 5 atmospheres for 30 minutes and then were put back into a room of 25° C. and a relative humidity of 60%, and the warping amounts of panels after three days were evaluated.

The warping amount was evaluated using the following standards on the basis of the upward bending of the four corners of the panel from the ground. The results are shown in Tables 6 and 7 below.

<Evaluation Standards>

A: A level at which the degree of warping did not change before and after autoclaving, and there was no problem with the mounting of circuits.

B: A level at which the panel was somewhat warped, but circuits could be mounted in machines.

C: A level at which the panel was warped, but it was difficult to mount circuits in machines.

[Pencil Hardness Evaluation]

In addition, for the front-side polarizing plates in the liquid crystal display devices produced in Examples 9 to 13, the pencil hardness was evaluated on the basis of JIS K5400.

Specifically, each of the front-side polarizing plates was attached to a glass plate using a pressure sensitive adhesive having the same thickness as when the front-side polarizing plate was attached to the liquid crystal cell in the examples.

After the humidity of this glass plate-attached front-side polarizing plate was adjusted at 25° C. and a relative humidity of 60% for two hours, a 4.9 N load was repeatedly applied to the front-side polarizing plate n times using testing pencils of F to 5H regulated by JIS S6006, the pencil hardness was evaluated using determinations as described below, and the peak hardness at which A evaluation was satisfied was used as an evaluation value.

A evaluation: In an evaluation with n=5, scratches were not generated or two or less scratches were generated even when generated.

B evaluation: In an evaluation with n=5, three or more scratches were generated.

TABLE 6

| | | Rear-side polarizing plate | | | | | | |
|---|---|---|---|---|---|---|---|---|
| | | Rear-side polarizer | | | | | | |
| | Kind | Thickness [μm] | Modulus of elasticity in MD direction [GPa] | Humidity dimensional change ratio in MD direction [%] | Thickness of pressure sensitive adhesive [μm] | D2 [μm] | T2 [μm] | Y value |
| Example 1 | Polarizing plate 1 | 15 | 17 | 0.87 | 20 | 179.5 | 22 | 0.398 |
| Example 2 | Polarizing plate 2 | 15 | 17 | 0.87 | 20 | 182.5 | 25 | 0.405 |
| Example 3 | Polarizing plate 3 | 15 | 17 | 0.87 | 20 | 187.5 | 30 | 0.405 |
| Example 4 | Polarizing plate 4 | 17 | 17 | 0.87 | 20 | 180.5 | 22 | 0.454 |
| Example 5 | Polarizing plate 1 | 15 | 17 | 0.87 | 20 | 179.5 | 22 | 0.398 |
| Example 6 | Polarizing plate 5 | 15 | 17 | 0.87 | 20 | 177.5 | 20 | 0.394 |

TABLE 6-continued

|  |  | Thickness | Modulus of elasticity in TD direction [GPa] | Humidity dimensional change ratio in TD direction [%] | Thickness of pressure sensitive adhesive [µm] | D1 [µm] | T1 [µm] | X value |
|---|---|---|---|---|---|---|---|---|
| Example 7 | Polarizing plate 6 | 15 | 20 | 0.87 | 20 | 179.5 | 22 | 0.468 |
| Example 8 | Polarizing plate 7 | 15 | 17 | 1.00 | 20 | 179.5 | 22 | 0.458 |
| Example 9 | Polarizing plate 20 | 13 | 17 | 0.87 | 15 | 185.5 | 29 | 0.357 |
| Example 10 | Polarizing plate 20 | 13 | 17 | 0.87 | 10 | 180.5 | 24 | 0.347 |
| Example 11 | Polarizing plate 22 | 13 | 17 | 0.87 | 20 | 178.5 | 22 | 0.343 |
| Example 12 | Polarizing plate 22 | 13 | 17 | 0.87 | 20 | 178.5 | 22 | 0.343 |
| Example 13 | Polarizing plate 20 | 13 | 17 | 0.87 | 15 | 185.5 | 29 | 0.357 |
| Comparative Example 1 | Polarizing plate 5 | 15 | 17 | 0.87 | 20 | 177.5 | 20 | 0.394 |
| Comparative Example 2 | Polarizing plate 8 | 15 | 17 | 0.87 | 20 | 202.5 | 45 | 0.449 |

Front-side polarizing plate

Front-side polarizer

|  | Kind | Thickness [µm] | Modulus of elasticity in TD direction [GPa] | Humidity dimensional change ratio in TD direction [%] | Thickness of pressure sensitive adhesive [µm] | D1 [µm] | T1 [µm] | X value |
|---|---|---|---|---|---|---|---|---|
| Example 1 | Polarizing plate 9 | 15 | 6 | 2.30 | 20 | 217.5 | 60 | 0.450 |
| Example 2 | Polarizing plate 9 | 15 | 6 | 2.30 | 20 | 217.5 | 60 | 0.450 |
| Example 3 | Polarizing plate 9 | 15 | 6 | 2.30 | 20 | 217.5 | 60 | 0.450 |
| Example 4 | Polarizing plate 9 | 15 | 6 | 2.30 | 20 | 217.5 | 60 | 0.450 |
| Example 5 | Polarizing plate 10 | 13 | 6 | 2.30 | 20 | 216.5 | 60 | 0.388 |
| Example 6 | Polarizing plate 10 | 13 | 6 | 2.30 | 20 | 216.5 | 60 | 0.388 |
| Example 7 | Polarizing plate 9 | 15 | 6 | 2.30 | 20 | 217.5 | 60 | 0.450 |
| Example 8 | Polarizing plate 9 | 15 | 6 | 2.30 | 20 | 217.5 | 60 | 0.450 |
| Example 9 | Polarizing plate 21 | 13 | 6 | 2.30 | 25 | 221.5 | 65 | 0.397 |
| Example 10 | Polarizing plate 21 | 13 | 6 | 2.30 | 10 | 206.5 | 50 | 0.370 |
| Example 11 | Polarizing plate 21 | 13 | 6 | 2.30 | 10 | 206.5 | 50 | 0.370 |
| Example 12 | Polarizing plate 21 | 13 | 6 | 2.30 | 15 | 211.5 | 55 | 0.379 |
| Example 13 | Polarizing plate 23 | 13 | 6 | 1.30 | 15 | 196.5 | 40 | 0.353 |
| Comparative Example 1 | Polarizing plate 9 | 15 | 6 | 2.30 | 20 | 217.5 | 60 | 0.450 |
| Comparative Example 2 | Polarizing plate 9 | 15 | 6 | 2.30 | 20 | 217.5 | 60 | 0.450 |

Evaluation result

|  | Ratio (Y/X) | X value + Y value | 0.034 × Z value | Warping amount after autoclaving | Warping amount after thermal treatment | Membrane thickness of two membranes [µm] | Pencil hardness |
|---|---|---|---|---|---|---|---|
| Example 1 | 0.88 | 0.85 | 0.73 | B | C | 152 | — |
| Example 2 | 0.90 | 0.86 | 0.73 | B | C | 155 | — |
| Example 3 | 0.90 | 0.87 | 0.73 | B | C | 160 | — |
| Example 4 | 1.01 | 0.90 | 0.73 | A | B | 154 | — |
| Example 5 | 1.03 | 0.79 | 0.73 | A | B | 150 | — |
| Example 6 | 1.01 | 0.78 | 0.73 | A | B | 148 | — |
| Example 7 | 1.04 | 0.92 | 0.73 | A | B | 152 | — |
| Example 8 | 1.02 | 0.91 | 0.73 | A | B | 152 | — |
| Example 9 | 0.90 | 0.75 | 0.73 | B | C | 160 | H |
| Example 10 | 0.94 | 0.72 | 0.73 | A | B | 160 | 2H |
| Example 11 | 0.93 | 0.71 | 0.73 | A | B | 148 | 2H |

TABLE 6-continued

| | | | | | | | |
|---|---|---|---|---|---|---|---|
| Example 12 | 0.90 | 0.72 | 0.73 | A | B | 148 | 2H |
| Example 13 | 1.01 | 0.71 | 0.73 | A | A | 145 | 2H |
| Comparative Example 1 | 0.87 | 0.84 | 0.73 | C | C | 150 | — |
| Comparative Example 2 | 1.00 | 0.90 | 0.73 | A | B | 175 | — |

TABLE 7

| | Rear-side polarizing plate | | | | | | | | Front-side polarizing plate | |
|---|---|---|---|---|---|---|---|---|---|---|
| | Rear-side polarizer | | | | | | | | | |
| | Kind | Thickness [μm] | Modulus of elasticity in TD direction [GPa] | Humidity dimensional change ratio in TD direction [%] | D2 [μm] | T2 [μm] | Y value | Kind | | Front-side polarizer Thickness [μm] |
| Example 14 | Polarizing plate 11 | 17 | 6 | 2.30 | 528.5 | 20 | 1.193 | Polarizing plate 18 | | 15 |
| Example 15 | Polarizing plate 12 | 17 | 6 | 2.30 | 530.6 | 22.1 | 1.198 | Polarizing plate 18 | | 15 |
| Example 16 | Polarizing plate 13 | 15 | 6 | 2.30 | 527.5 | 20 | 1.051 | Polarizing plate 19 | | 13 |
| Example 17 | Polarizing plate 14 | 15 | 6 | 2.30 | 529.6 | 22.1 | 1.055 | Polarizing plate 19 | | 13 |
| Example 18 | Polarizing plate 15 | 15 | 7 | 2.30 | 529.6 | 22.1 | 1.231 | Polarizing plate 18 | | 15 |
| Example 19 | Polarizing plate 16 | 15 | 6 | 2.70 | 529.6 | 22.1 | 1.238 | Polarizing plate 18 | | 15 |
| Comparative Example 3 | Polarizing plate 13 | 15 | 6 | 2.30 | 507.5 | 20 | 1.051 | Polarizing plate 18 | | 15 |
| Comparative Example 4 | Polarizing plate 17 | 15 | 6 | 2.30 | 559.5 | 72 | 1.158 | Polarizing plate 17 | | 15 |

| | Front-side polarizing plate | | | | | | | Evaluation result | |
|---|---|---|---|---|---|---|---|---|---|
| | Front-side polarizer | | | | | | | | |
| | Modulus of elasticity in MD direction [GPa] | Humidity dimensional change ratio in MD direction [%] | D1 [μm] | T1 [μm] | X value | Ratio [Y/X] | Warping amount after autoclaving | | Membrane thickness of two membranes [μm] |
| Example 14 | 17 | 0.87 | 574.5 | 67 | 1.230 | 0.97 | A | | 152 |
| Example 15 | 17 | 0.87 | 574.5 | 67 | 1.230 | 0.97 | A | | 153 |
| Example 16 | 17 | 0.87 | 573.5 | 67 | 1.064 | 0.99 | A | | 148 |
| Example 17 | 17 | 0.87 | 573.5 | 67 | 1.064 | 0.99 | A | | 149 |
| Example 18 | 17 | 0.87 | 574.5 | 67 | 1.230 | 1.00 | A | | 151 |
| Example 19 | 17 | 0.87 | 574.5 | 67 | 1.230 | 1.01 | A | | 151 |
| Comparative Example 3 | 17 | 0.87 | 554.5 | 67 | 1.230 | 0.85 | C | | 150 |
| Comparative Example 4 | 17 | 0.87 | 559.5 | 72 | 1.241 | 0.93 | B | | 190 |

From the results shown in Tables 5 to 7, it was found that, in both Comparative Examples 1 and 3 in which the ratio between the X value which was computed by multiplying the thickness of the front-side polarizer, the modulus of elasticity of the front-side polarizer, the humidity dimensional change ratio of the front-side polarizer, and the distance D1 and the Y value which was computed by multiplying the thickness of the rear-side polarizer, the modulus of elasticity of the rear-side polarizer, the humidity dimensional change ratio of the rear-side polarizer, and the distance D2 was outside a range of 1±0.12, the warping amounts increased.

In addition, in Comparative Examples 2 and 4 in which the membrane thickness of the inner polymer film in the rear-side polarizing plate was thick, and the distance T2 (0 to 10 μm) between the rear-side polarizer and the liquid crystal cell was not satisfied, there was no problem with warping, but the thickness was not reduced.

In contrast, it was found that, in all of Examples 1 to 19 in which the ratio between the X value which was computed by multiplying the thickness of the front-side polarizer, the modulus of elasticity of the front-side polarizer, the humidity dimensional change ratio of the front-side polarizer, and the distance D1 and the Y value which was computed by multiplying the thickness of the rear-side polarizer, the modulus of elasticity of the rear-side polarizer, the humidity dimensional change ratio of the rear-side polarizer, and the distance D2 was in a range of 1±0.12 even in a case in which the thickness of the rear-side polarizing plate was reduced, the warping amounts decreased.

Particularly, from the comparison between Examples 1 to 3 and Examples 4 to 8, it was found that, when the ratio was in a range of 1±0.05, the warping amount was small, and the occurrence of warping could be further suppressed.

In addition, from the comparison between Example 9 and Examples 10 to 13, it was found that, in a case in which the Z value which is computed by multiplying the modulus of elasticity of the glass substrate in the liquid crystal cell and the total thickness of the glass substrate satisfies "X+Y<0.034×Z" in the relationship with the above-described X value and Y value (Examples 10 to 13), the warping amount was small, and the occurrence of warping could be further suppressed, and it was found that the pencil hardness also increases.

EXPLANATION OF REFERENCES

1: front-side outer polymer film
2: front-side polarizer
3: front-side inner functional layer
4: liquid crystal cell
5: rear-side inner functional layer
6: rear-side polarizer
7: rear-side outer polymer film
10: liquid crystal display device
20: front-side polarizing plate
30: rear-side polarizing plate

What is claimed is:

1. A liquid crystal display device comprising:
a front-side polarizing plate having at least a front-side polarizer;
a liquid crystal cell; and
a rear-side polarizing plate having at least a rear-side polarizer in this order,
wherein a distance D1 from a central portion of the front-side polarizer in a thickness direction to a central portion of the liquid crystal cell in the thickness direction and a distance D2 from a central portion of the rear-side polarizer in the thickness direction to the central portion of the liquid crystal cell in the thickness direction are different from each other,
a ratio between an X value which is computed by multiplying a thickness of the front-side polarizer, a modulus of elasticity of the front-side polarizer, a humidity dimensional change ratio of the front-side polarizer, and the distance D1 and a Y value which is computed by multiplying a thickness of the rear-side polarizer, a modulus of elasticity of the rear-side polarizer, a humidity dimensional change ratio of the rear-side polarizer, and the distance D2 is in a range of 1±0.12,
a distance T1 from a surface of the front-side polarizer on a liquid crystal cell side to a surface of the liquid crystal cell on a front-side polarizer side in the front-side polarizing plate is 40 μm or more, and
a distance T2 from a surface of the rear-side polarizer on a liquid crystal cell side to a surface of the liquid crystal cell on a rear-side polarizer side in the rear-side polarizing plate is in a range of 0 to 30 μm.

2. The liquid crystal display device according to claim 1, wherein the front-side polarizing plate has a front-side inner functional layer between the front-side polarizer and the liquid crystal cell.

3. The liquid crystal display device according to claim 1, wherein the rear-side polarizing plate has a rear-side inner functional layer between the rear-side polarizer and the liquid crystal cell.

4. The liquid crystal display device according to claim 1, wherein, in the rear-side polarizing plate, the rear-side polarizer and the liquid crystal cell are adjacent to each other directly or via a pressure sensitive adhesive or an adhesive.

5. The liquid crystal display device according to claim 1, wherein the front-side polarizing plate has a front-side outer polymer film on a side of the front-side polarizer opposite to the liquid crystal cell.

6. The liquid crystal display device according to claim 2, wherein the front-side polarizing plate has a front-side outer polymer film on a side of the front-side polarizer opposite to the liquid crystal cell.

7. The liquid crystal display device according to claim 3, wherein the front-side polarizing plate has a front-side outer polymer film on a side of the front-side polarizer opposite to the liquid crystal cell.

8. The liquid crystal display device according to claim 4, wherein the front-side polarizing plate has a front-side outer polymer film on a side of the front-side polarizer opposite to the liquid crystal cell.

9. The liquid crystal display device according to claim 1, wherein the rear-side polarizing plate has a rear-side outer polymer film on a side of the rear-side polarizer opposite to the liquid crystal cell.

10. The liquid crystal display device according to claim 2, wherein the rear-side polarizing plate has a rear-side outer polymer film on a side of the rear-side polarizer opposite to the liquid crystal cell.

11. The liquid crystal display device according to claim 3, wherein the rear-side polarizing plate has a rear-side outer polymer film on a side of the rear-side polarizer opposite to the liquid crystal cell.

12. The liquid crystal display device according to claim 4, wherein the rear-side polarizing plate has a rear-side outer polymer film on a side of the rear-side polarizer opposite to the liquid crystal cell.

13. The liquid crystal display device according to claim 5, wherein the rear-side polarizing plate has a rear-side outer polymer film on a side of the rear-side polarizer opposite to the liquid crystal cell.

14. The liquid crystal display device according to claim 1, wherein the X value which is computed by multiplying the thickness of the front-side polarizer, the modulus of elasticity of the front-side polarizer, the humidity dimensional change ratio of the front-side polarizer, and the distance D1, the Y value which is computed by multiplying the thickness of the rear-side polarizer, the modulus of elasticity of the rear-side polarizer, the humidity dimensional change ratio of the rear-side polarizer, and the distance D2, and a Z value which is computed by multiplying a modulus of elasticity of a glass substrate in the liquid crystal cell and a total thickness of the glass substrate satisfy Expression (1) below:

$$X+Y<0.034\times Z \qquad (1).$$

15. The liquid crystal display device according to claim 2, wherein the X value which is computed by multiplying the thickness of the front-side polarizer, the modulus of elasticity of the front-side polarizer, the humidity dimensional change ratio of the front-side polarizer, and the distance D1, the Y value which is computed by multiplying the thickness of the rear-side polarizer, the modulus of elasticity of the rear-side polarizer, the humidity dimensional change ratio of the rear-side polarizer, and the distance D2, and a Z value which is computed by multiplying a modulus of elasticity of a glass substrate in the liquid crystal cell and a total thickness of the glass substrate satisfy Expression (1) below:

$$X+Y<0.034\times Z \tag{1}$$

16. The liquid crystal display device according to claim 3, wherein the X value which is computed by multiplying the thickness of the front-side polarizer, the modulus of elasticity of the front-side polarizer, the humidity dimensional change ratio of the front-side polarizer, and the distance D1, the Y value which is computed by multiplying the thickness of the rear-side polarizer, the modulus of elasticity of the rear-side polarizer, the humidity dimensional change ratio of the rear-side polarizer, and the distance D2, and a Z value which is computed by multiplying a modulus of elasticity of a glass substrate in the liquid crystal cell and a total thickness of the glass substrate satisfy Expression (1) below:

$$X+Y<0.034\times Z \tag{1}$$

17. The liquid crystal display device according to claim 4, wherein the X value which is computed by multiplying the thickness of the front-side polarizer, the modulus of elasticity of the front-side polarizer, the humidity dimensional change ratio of the front-side polarizer, and the distance D1, the Y value which is computed by multiplying the thickness of the rear-side polarizer, the modulus of elasticity of the rear-side polarizer, the humidity dimensional change ratio of the rear-side polarizer, and the distance D2, and a Z value which is computed by multiplying a modulus of elasticity of a glass substrate in the liquid crystal cell and a total thickness of the glass substrate satisfy Expression (1) below:

$$X+Y<0.034\times Z \tag{1}$$

18. The liquid crystal display device according to claim 5, wherein the X value which is computed by multiplying the thickness of the front-side polarizer, the modulus of elasticity of the front-side polarizer, the humidity dimensional change ratio of the front-side polarizer, and the distance D1, the Y value which is computed by multiplying the thickness of the rear-side polarizer, the modulus of elasticity of the rear-side polarizer, the humidity dimensional change ratio of the rear-side polarizer, and the distance D2, and a Z value which is computed by multiplying a modulus of elasticity of a glass substrate in the liquid crystal cell and a total thickness of the glass substrate satisfy Expression (1) below:

$$X+Y<0.034\times Z \tag{1}$$

19. The liquid crystal display device according to claim 9, wherein the X value which is computed by multiplying the thickness of the front-side polarizer, the modulus of elasticity of the front-side polarizer, the humidity dimensional change ratio of the front-side polarizer, and the distance D1, the Y value which is computed by multiplying the thickness of the rear-side polarizer, the modulus of elasticity of the rear-side polarizer, the humidity dimensional change ratio of the rear-side polarizer, and the distance D2, and a Z value which is computed by multiplying a modulus of elasticity of a glass substrate in the liquid crystal cell and a total thickness of the glass substrate satisfy Expression (1) below:

$$X+Y<0.034\times Z \tag{1}$$

20. The liquid crystal display device according to claim 1, wherein the front-side polarizing plate and the liquid crystal cell are adjacent to each other via a pressure sensitive adhesive or an adhesive, and a thickness of the pressure sensitive adhesive or the adhesive is 15 μm or less.

* * * * *